(12) United States Patent
Xue et al.

(10) Patent No.: US 11,856,577 B2
(45) Date of Patent: Dec. 26, 2023

(54) INDICATION OF SIDELINK PROCESS FOR SIDELINK FEEDBACK

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/305,595

(22) Filed: Jul. 9, 2021

(65) Prior Publication Data
US 2023/0010997 A1  Jan. 12, 2023

(51) Int. Cl.
*H04W 72/04* (2023.01)
*H04L 1/18* (2023.01)
(Continued)

(52) U.S. Cl.
CPC ........... *H04W 72/20* (2023.01); *H04L 1/1812* (2013.01)

(58) Field of Classification Search
CPC ... H04W 28/04; H04W 72/04; H04W 72/042; H04W 88/08; H04W 72/11; H04W 72/115; H04W 72/40; H04W 72/23; H04W 72/20; H04W 72/0406; H04L 5/0007; H04L 1/1812
(Continued)

(56) References Cited

U.S. PATENT DOCUMENTS

| 2009/0028172 A1* | 1/2009 | Scott | H04L 45/28 370/419 |
| 2014/0245095 A1* | 8/2014 | Nammi | H04L 5/0055 714/749 |

(Continued)

FOREIGN PATENT DOCUMENTS

| EP | 3 890 416 A1 * | 10/2021 | ............ H04W 72/02 |
| WO | WO-2004023736 A1 | 3/2004 | |

(Continued)

OTHER PUBLICATIONS

International Search Report and Written Opinion—PCT/US2022/072461—ISA/EPO—dated Sep. 1, 2022.

*Primary Examiner* — Peter G Solinsky
*Assistant Examiner* — Sanjay K Dewan
(74) *Attorney, Agent, or Firm* — Arun Swain

(57) ABSTRACT

This disclosure provides systems, methods and apparatuses for indicating sidelink processes for sidelink feedback. A second user equipment (UE) may request hybrid automatic repeat request (HARD) responses from a first UE for a particular set of sidelink processes over a physical sidelink feedback channel. To indicate multiple sidelink processes, the second UE may indicate, in sidelink control information, a window of sidelink processes. The window may be a sliding window that starts with a starting sidelink process and extends through other sidelink processes. The second UE may transmit data for the sidelink processes in the sliding window and receive feedback for the indicated sidelink processes. In some aspects, the first UE may select, in coordination with the second UE, the sidelink processes for which feedback is to be provided.

30 Claims, 18 Drawing Sheets

(51) Int. Cl.
*H04W 72/20* (2023.01)
*H04L 1/1812* (2023.01)

(58) Field of Classification Search
USPC .......................................................... 370/329
See application file for complete search history.

(56) References Cited

U.S. PATENT DOCUMENTS

| | | | |
|---|---|---|---|
| 2020/0008183 A1* | 1/2020 | Chen | H04W 72/51 |
| 2020/0022089 A1* | 1/2020 | Guo | H04W 52/242 |
| 2020/0163103 A1* | 5/2020 | Kuang | H04W 72/23 |
| 2020/0205166 A1* | 6/2020 | Huang | H04L 1/1819 |
| 2020/0220694 A1* | 7/2020 | Khoryaev | H04L 1/1816 |
| 2020/0229171 A1* | 7/2020 | Khoryaev | H04W 4/40 |
| 2020/0229173 A1* | 7/2020 | Cao | H04W 74/0816 |
| 2020/0275474 A1* | 8/2020 | Chen | H04L 1/1896 |
| 2020/0314804 A1* | 10/2020 | Shin | H04W 24/10 |
| 2020/0351033 A1* | 11/2020 | Ryu | H04W 72/0453 |
| 2020/0374861 A1* | 11/2020 | Shilov | H04W 72/20 |
| 2021/0037468 A1* | 2/2021 | Huang | H04W 52/0216 |
| 2021/0051525 A1* | 2/2021 | Cao | H04W 72/02 |
| 2021/0144582 A1* | 5/2021 | Yi | H04W 72/23 |
| 2021/0160849 A1* | 5/2021 | Sun | H04W 72/23 |
| 2022/0078782 A1* | 3/2022 | Zhao | H04W 72/0446 |
| 2022/0312389 A1* | 9/2022 | Li | H04W 72/02 |
| 2022/0322304 A1* | 10/2022 | Hui | H04W 72/044 |
| 2022/0330267 A1* | 10/2022 | Hui | H04B 17/327 |
| 2022/0361147 A1* | 11/2022 | Sarkis | H04W 72/56 |
| 2023/0007728 A1* | 1/2023 | Kung | H04W 76/28 |

FOREIGN PATENT DOCUMENTS

| | | | | |
|---|---|---|---|---|
| WO | WO-2017209922 | | 12/2017 | |
| WO | WO 2020/106643 A1 * | 5/2020 | | H04W 72/12 |
| WO | WO 2020/222568 A1 * | 11/2020 | | H04L 1/18 |
| WO | WO 2021/206466 A1 * | 10/2021 | | H04W 72/12 |
| WO | WO 2021/248096 A1 * | 12/2021 | | H04W 88/04 |

* cited by examiner

| 4-bit sequence | Set of polled SL processes | PSFCH capacity |
|---|---|---|
| "0000" | None | 1 bit |
| "0001" | {0-15} | 16 bits |
| "0010" | {0-7} | 8 bits |
| "0011" | {8-15} | 8 bits |
| "0100" | {0-3} | 4 bits |
| "0101" | {4-7} | 4 bits |
| "0110" | {8-11} | 4 bits |
| "0111" | {12-15} | 4 bits |

| 4-bit sequence | Set of polled SL processes | PSFCH capacity |
|---|---|---|
| "1000" | {0, 1} | 2 bits |
| "1001" | {2, 3} | 2 bits |
| "1010" | {4, 5} | 2 bits |
| "1011" | {6, 7} | 2 bits |
| "1100" | {8, 9} | 2 bits |
| "1101" | {10, 11} | 2 bits |
| "1110" | {12, 13} | 2 bits |
| "1111" | {14, 15} | 2 bits |

INDICATION OF SIDELINK PROCESS FOR SIDELINK FEEDBACK

TECHNICAL FIELD

Aspects of the present disclosure relate generally to wireless communication and to techniques for indicating a sidelink process for sidelink feedback.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New radio (NR), which also may be referred to as is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a first user equipment (UE). The method may include receiving, from a second UE, sidelink control information (SCI) that indicates a starting sidelink process of a sliding window of sidelink processes for which one or more hybrid automatic repeat request (HARQ) responses are to be transmitted. The method may include transmitting the one or more HARQ responses to the second UE on a physical sidelink feedback channel (PSFCH).

In some implementations, the SCI indicates the starting sidelink process with m bits, and m bits is a bit capacity of the PSFCH. In some implementations, a HARQ response is requested for a current sidelink process, and m−1 bits indicate the starting sidelink process for a remainder of the sliding window.

In some implementations, a HARQ response is not requested for a current sidelink process, the SCI indicates the starting sidelink process with m−1 bits, and m bits is a bit capacity of the PSFCH. In some implementations, m is a specified value stored at the first UE, and the SCI indicates the starting sidelink process with a $\log_2(m)$-bit control sequence.

In some implementations, the SCI indicates the sliding window with m bits, and the sliding window is one of multiple candidate sliding windows that are each associated with a bit capacity n of the PSFCH.

Another innovative aspect of the subject matter described in this disclosure can be implemented in an apparatus of a first UE for wireless communication. The apparatus may include a first interface configured to obtain, from a second UE, SCI that indicates a starting sidelink process of a sliding window of sidelink processes for which one or more HARQ responses are to be transmitted. The apparatus may include a second interface, and the first interface or the second interface is configured to output the one or more HARQ responses to the second UE on a PSFCH.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a first UE, may cause the one or more processors to receive, from a second UE, SCI that indicates a starting sidelink process of a sliding window of sidelink processes for which one or more HARQ responses are to be transmitted. The set of instructions, when executed by one or more processors of the first UE, may cause the one or more processors to transmit the one or more HARQ responses to the second UE on a PSFCH.

Another innovative aspect of the subject matter described in this disclosure can be implemented in an apparatus for wireless communication. The apparatus may include means for receiving, from another apparatus, SCI that indicates a starting sidelink process of a sliding window of sidelink processes for which one or more HARQ responses are to be transmitted. The apparatus may include means for transmitting the one or more HARQ responses to the other apparatus on a PSFCH.

Another innovative aspect of the subject matter described in this disclosure can be implemented in a method of wireless communication performed by an apparatus of a second UE. The method may include transmitting, to a first UE, SCI that indicates a starting sidelink process of a sliding window of sidelink processes for which one or more HARQ responses are to be transmitted. The method may include receiving the one or more HARQ responses from the first UE on a PSFCH.

In some implementations, the SCI indicates the starting sidelink process with m bits, and m bits is a bit capacity of the PSFCH. In some implementations, a HARQ response is requested for a current sidelink process, and m−1 bits indicate the starting sidelink process for a remainder of the sliding window.

In some implementations, a HARQ response is not requested for a current sidelink process, the SCI indicates the starting sidelink process with m−1 bits, and m bits is a bit capacity of the PSFCH. In some implementations, m is a specified value stored at the first UE, and the SCI indicates the starting sidelink process with a $\log_2(m)$-bit control sequence.

In some implementations, the SCI indicates the sliding window with m bits, and the sliding window is one of multiple candidate sliding windows that are each associated with a bit capacity n of the PSFCH.

Another innovative aspect of the subject matter described in this disclosure can be implemented in an apparatus of a second UE for wireless communication. The apparatus may include a first interface configured to output, to a first UE, SCI that indicates a starting sidelink process of a sliding window of sidelink processes for which one or more HARQ responses are to be transmitted. The apparatus may include a second interface. The first interface or the second interface may be configured to obtain the one or more HARQ responses from the first UE on a PSFCH.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a second UE, may cause the one or more processors to transmit, to a first UE, SCI that indicates a starting sidelink process of a sliding window of sidelink processes for which one or more HARQ responses are to be transmitted. The set of instructions, when executed by one or more processors of the second UE, may cause the one or more processors to receive the one or more HARQ responses from the first UE on a PSFCH.

Another innovative aspect of the subject matter described in this disclosure can be implemented in an apparatus for wireless communication. The apparatus may include means for transmitting, to another apparatus, SCI that indicates a starting sidelink process of a sliding window of sidelink processes for which one or more HARQ responses are to be transmitted. The apparatus may include means for receiving the one or more HARQ responses from the other apparatus on a PSFCH.

One innovative aspect of the subject matter described in this disclosure can be implemented in a method of wireless communication performed by an apparatus of a first UE. The method may include selecting, in coordination with a second UE, a set of sidelink processes for which one or more HARQ responses are able to be transmitted. The method may include transmitting, to the second UE on a PSFCH, the one or more HARQ responses for sidelink processes within the set of sidelink processes.

In some implementations, transmitting the one or more HARQ responses includes transmitting, independent of receiving SCI associated with HARQ, HARQ responses for all sidelink processes in the set of sidelink processes. In some implementations, transmitting the one or more HARQ responses includes transmitting, in connection with receiving SCI associated with HARQ, HARQ responses for all sidelink processes in the set of sidelink processes.

Another innovative aspect of the subject matter described in this disclosure can be implemented in an apparatus of a first UE for wireless communication. The apparatus may include a first interface and a second interface configured to select, in coordination with a second UE, a set of sidelink processes for which one or more HARQ responses are able to be transmitted. The first interface or the second interface may be configured to output, to the second UE on a PSFCH, the one or more HARQ responses for sidelink processes within the set of sidelink processes.

In some implementations, the first interface or the second interface may be configured to output, independent of receiving SCI associated with HARQ, HARQ responses for all sidelink processes in the set of sidelink processes. In some implementations, the first interface or the second interface may be configured to output, in connection with receiving SCI associated with HARQ, HARQ responses for all sidelink processes in the set of sidelink processes.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a first UE, may cause the one or more processors to select, in coordination with a second UE, a set of sidelink processes for which one or more HARQ responses are able to be transmitted. The set of instructions, when executed by one or more processors of the first UE, may cause the one or more processors to transmit, to the second UE on a PSFCH, the one or more HARQ responses for sidelink processes within the set of sidelink processes.

In some implementations, the one or more instructions, when executed by one or more processors of the first UE, may cause the one or more processors to transmit, independent of receiving SCI associated with HARQ, HARQ responses for all sidelink processes in the set of sidelink processes. In some implementations, the one or more instructions, when executed by one or more processors of the first UE, may cause the one or more processors to transmit, in connection with receiving SCI associated with HARQ, HARQ responses for all sidelink processes in the set of sidelink processes.

Another innovative aspect of the subject matter described in this disclosure can be implemented in an apparatus for wireless communication. The apparatus may include means for selecting, in coordination with another apparatus, a set of sidelink processes for which one or more HARQ responses are able to be transmitted. The apparatus may include means for transmitting, to the other apparatus on a PSFCH, the one or more HARQ responses for sidelink processes within the set of sidelink processes.

In some implementations, the means for transmitting the one or more HARQ responses includes means for transmitting, independent of receiving SCI associated with HARQ, HARQ responses for all sidelink processes in the set of sidelink processes. In some implementations, the means for transmitting the one or more HARQ responses includes means for transmitting, in connection with receiving SCI associated with HARQ, HARQ responses for all sidelink processes in the set of sidelink processes.

Another innovative aspect of the subject matter described in this disclosure can be implemented in a method of wireless communication performed by an apparatus of a second UE. The method may include selecting, in coordination with a first UE, a set of sidelink processes for which one or more HARQ responses are able to be transmitted by the first UE. The method may include receiving, from the first UE on a PSFCH, the one or more HARQ responses for sidelink processes within the set of sidelink processes.

In some implementations, receiving the one or more HARQ responses includes receiving HARQ responses for all sidelink processes in the set of sidelink processes. In some implementations, the method may include transmitting SCI that requests HARQ responses for the set of sidelink processes.

Another innovative aspect of the subject matter described in this disclosure can be implemented in an apparatus of a second UE for wireless communication. The apparatus may include a first interface and a second interface configured to select, in coordination with a first UE, a set of sidelink processes for which one or more HARQ responses are able to be transmitted by the first UE. The first interface or the second interface may be configured to obtain, from the first UE on a PSFCH, the one or more HARQ responses for sidelink processes within the set of sidelink processes.

In some implementations, the first interface or the second interface may be configured to obtain HARQ responses for all sidelink processes in the set of sidelink processes. In some implementations, the first interface or the second interface may be configured to output SCI that requests HARQ responses for the set of sidelink processes.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a second UE, may cause the one or more processors to select, in coordination with a first UE, a set of sidelink processes for which one or more HARQ responses are able to be transmitted by the first UE. The set of instructions, when executed by one or more processors of the second UE, may cause the one or more processors to receive, from the first UE on a PSFCH, the one or more HARQ responses for sidelink processes within the set of sidelink processes.

In some implementations, the set of instructions, when executed by one or more processors of the second UE, may cause the one or more processors to receive HARQ responses for all sidelink processes in the set of sidelink processes. In some implementations, the set of instructions, when executed by one or more processors of the second UE, may cause the one or more processors to transmit SCI that requests HARQ responses for the set of sidelink processes.

Another innovative aspect of the subject matter described in this disclosure can be implemented in an apparatus for wireless communication. The apparatus may include means for selecting, in coordination with another apparatus, a set of sidelink processes for which one or more HARQ responses are able to be transmitted by the other apparatus. The apparatus may include means for receiving, from the other apparatus on a PSFCH, the one or more HARQ responses for sidelink processes within the set of sidelink processes.

In some implementations, the means for receiving the one or more HARQ responses includes means for receiving HARQ responses for all sidelink processes in the set of sidelink processes. In some implementations, the apparatus may include means for transmitting SCI that requests HARQ responses for the set of sidelink processes.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

FIG. 8 is a diagram illustrating an example of sets of polled sidelink processes.

Like reference numbers and designations in the various drawings indicate like elements.

DETAILED DESCRIPTION

Figure 1:
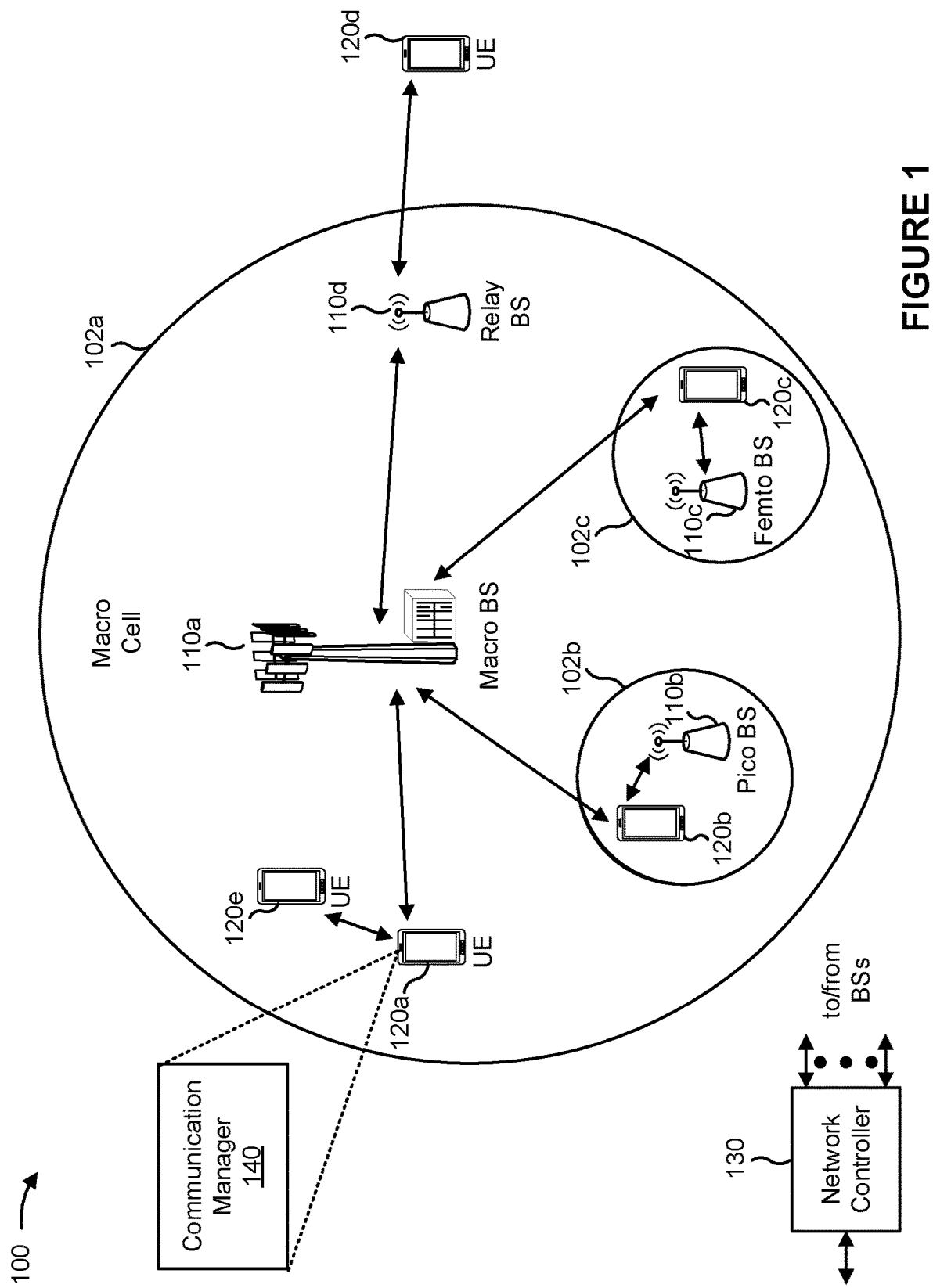
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G technology, 4G technology, 5G technology, or further implementations thereof.

A device, such as a UE, may communicate with a base station on an uplink channel or a downlink channel. The device also may communicate directly with one another device on a "sidelink" or a "sidelink channel." For example, a sidelink device, such as a first UE, may receive data on a sidelink from another sidelink device, such as a second UE. The sidelink may enable direct communication between vehicles, robots, and consumer devices without relying on a cellular network or other hierarchic logical nodes. While a UE may be a representation of a sidelink device, other nodes, devices, or wearables, among other examples, can be representative of sidelink devices. The data that is transmitted on the sidelink may include sidelink communications that are associated with one or more sidelink processes. A "sidelink process" may correspond to one of multiple hybrid automatic repeat request (HARQ) processes, such as up to sixteen (16) HARQ processes, that the second UE uses for transmission on a physical sidelink shared channel (PSSCH). The second UE may indicate HARQ process identifiers (IDs) for sidelink processes in sidelink control information (SCI). The first UE may transmit HARQ feedback to the second UE on a physical sidelink feedback channel (PSFCH). In some scenarios, the first UE may transmit a Type 3 HARQ codebook, which may involve HARQ feedback for multiple sidelink processes.

In some scenarios, the bit capacity of the PSFCH may be limited and thus the number of sidelink processes for which HARQ feedback can be transmitted may be fewer than all of the sidelink processes. Accordingly, the second UE may indicate, in SCI, sidelink processes for which the first UE is to transmit HARQ feedback. However, the SCI also may have limited bit capacity and may not have enough bits to indicate the specific sidelink processes for which the second UE is to request HARQ feedback.

According to various aspects described herein, the second UE may request HARQ responses for multiple sidelink processes. In some aspects, to indicate the multiple sidelink processes, the first UE may indicate, in SCI, a starting sidelink process of a sliding window of sidelink processes. The first UE may transmit HARQ feedback for the sidelink processes that are in the sliding window.

In some implementations, the first UE and second UE may coordinate with each other to select a set of sidelink processes within which HARQ feedback may be provided. For example, the second UE may transmit a set of sidelink processes, and the first UE may agree to the set of sidelink processes, reject the set of sidelink processes, or modify the set of sidelink processes. The agreed upon set of sidelink processes may be less than 16 sidelink processes, such as two sidelink processes, four sidelink processes, five sidelink processes, eight sidelink processes, ten sidelink processes, twelve sidelink processes, etc. The second UE may use sidelink processes that are in the agreed set of sidelink processes for data transmission and not use sidelink processes that are outside the agreed set of sidelink processes.

Particular implementations of the subject matter described in this disclosure can be implemented to realize one or more of the following potential advantages. By indicating a starting sidelink process of a sliding window of sidelink processes for which HARQ feedback is to be transmitted, the second UE may reduce a quantity of bits that are used in SCI to indicate sidelink processes, including for Type 3 codebook or partial Type 3 codebook. As a result, the first UE and the second UE may conserve signaling resources when using the SCI and the PSFCH. The first UE may transmit HARQ feedback, such as Type 3 codebook, for sidelink resources that would not otherwise be indicated by the second UE in SCI, without having to increase the bit capacity of the SCI or the bit capacity of the PSFCH. Delays for later transmission of HARQ may be avoided and communications may improve.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110. A UE may be a representation of a sidelink device, and other nodes, devices, small cells, or wearables, among other examples, can be representative sidelink devices.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a first UE, such as UE 120a, may include a communication manager 140. As described in more detail elsewhere herein, the communication manager 140 may receive, from a second UE, SCI that indicates a starting sidelink process of a sliding window of sidelink processes for which one or more HARQ responses are to be transmitted. The communication manager 140 may transmit the one or more HARQ responses to the second UE on a PSFCH. Additionally, or alternatively, the communication manager 140 may perform one or more other operations described herein.

In some aspects, a second UE, such as UE 120e, may include a communication manager 140. As described in more detail elsewhere herein, the communication manager 140 may transmit, to a first UE, SCI that indicates a starting sidelink process of a sliding window of sidelink processes for which one or more HARQ responses are to be transmitted. The communication manager 140 may receive the one or more HARQ responses from the first UE on a PSFCH. Additionally, or alternatively, the communication manager 140 may perform one or more other operations described herein.

In some aspects, a first UE, such as UE 120a, may include a communication manager 140. As described in more detail elsewhere herein, the communication manager 140 may select, in coordination with a second UE, a set of sidelink processes for which one or more HARQ responses are able to be transmitted. The communication manager 140 may transmit, to the second UE on a PSFCH, the one or more HARQ responses for sidelink processes within the set of sidelink processes. Additionally, or alternatively, the communication manager 140 may perform one or more other operations described herein.

In some aspects, a second UE, such as UE 120e, may include a communication manager 140. As described in more detail elsewhere herein, the communication manager 140 may select, in coordination with a first UE, a set of sidelink processes for which one or more HARQ responses are able to be transmitted by the first UE. The communication manager 140 may receive, from the first UE on a PSFCH, the one or more HARQ responses for sidelink processes within the set of sidelink processes. Additionally, or alternatively, the communication manager 140 may perform one or more other operations described herein.

Figure 2:
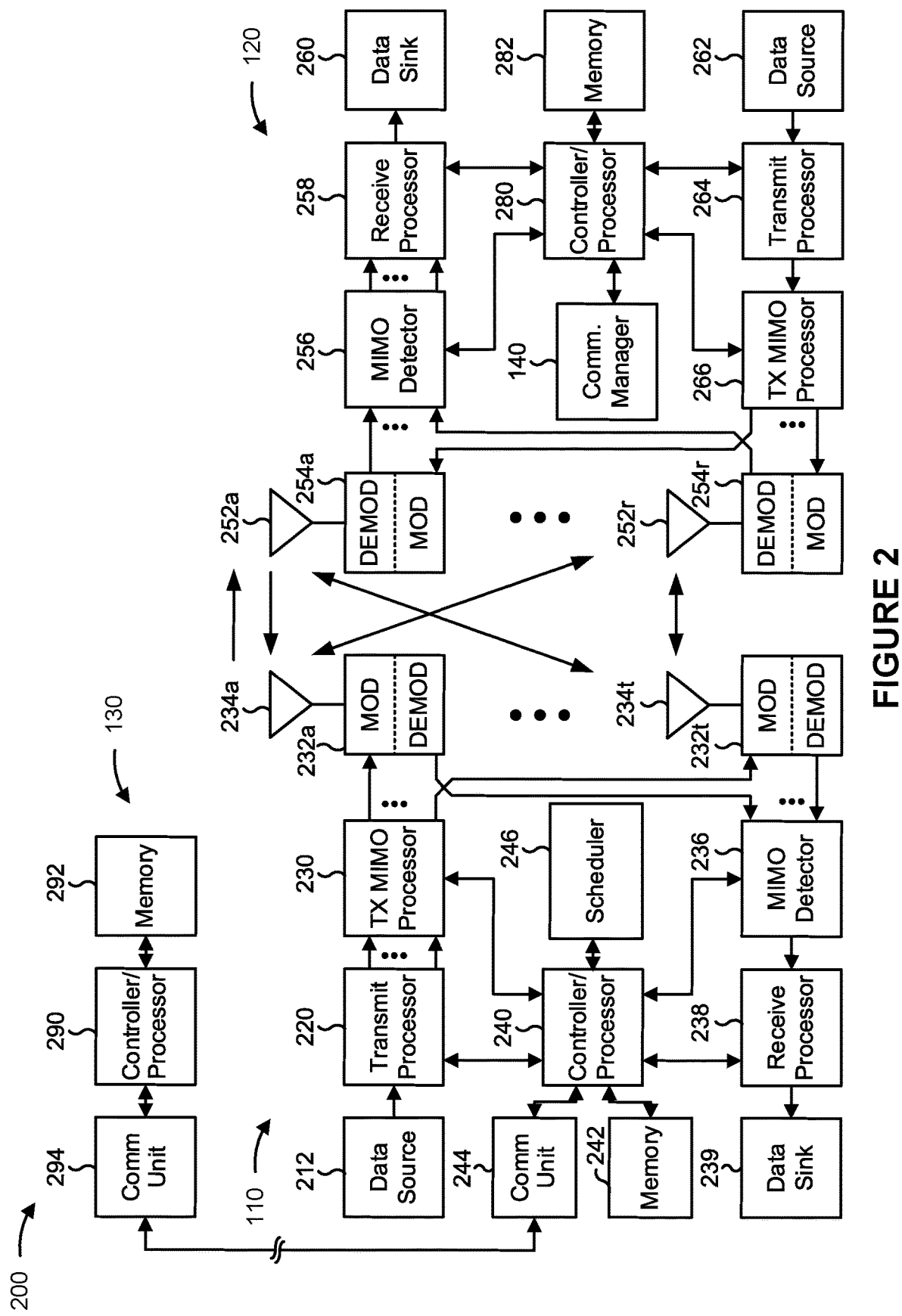
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The UE 120 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM) and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with indicating a sidelink process for sidelink feedback, as described in more detail elsewhere herein. A first UE, such as UE 120, and a second UE, such as UE 120, may be representations of a sidelink device, and other nodes, devices, small cells, or wearables, among other examples, can be representative sidelink devices.

Figure 11:
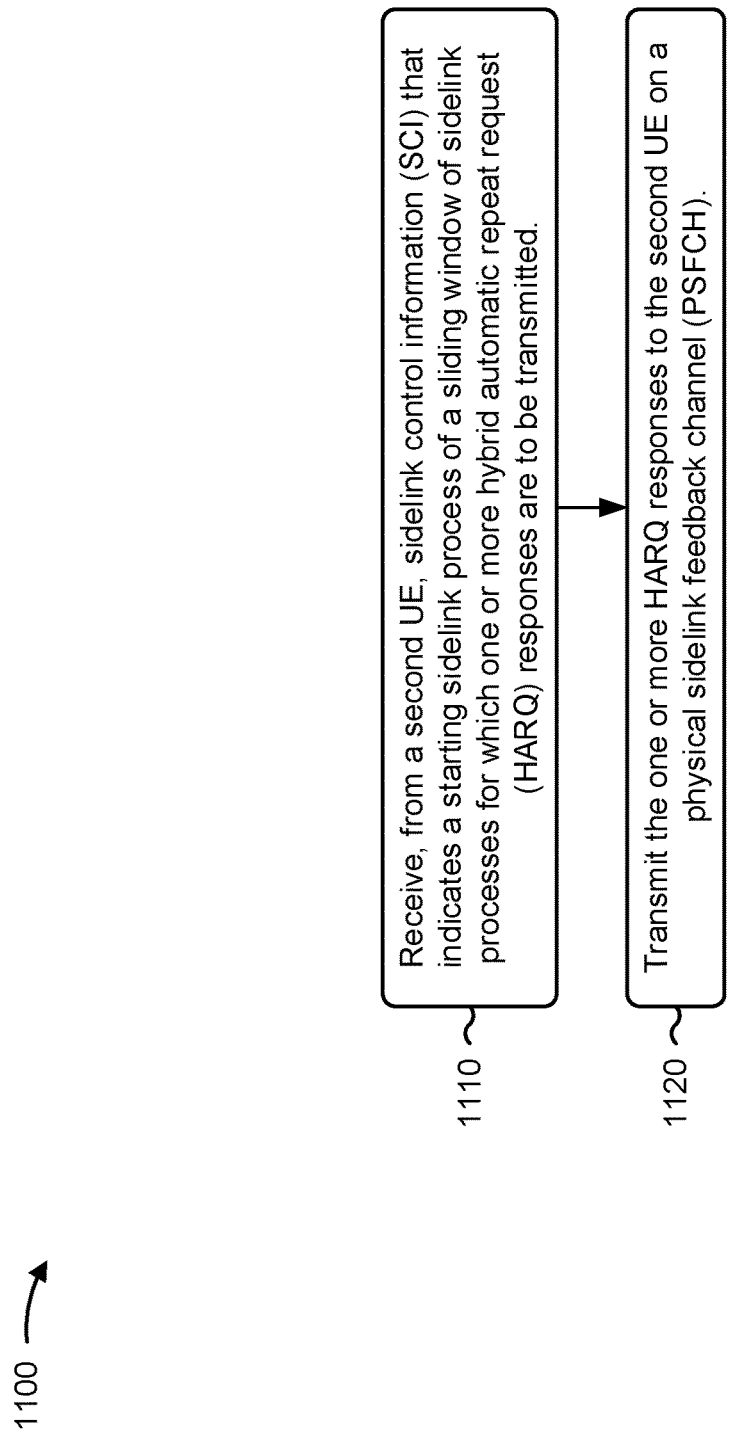
FIG. 11 is a diagram illustrating an example process performed, for example, by a first UE.
Figure 12:
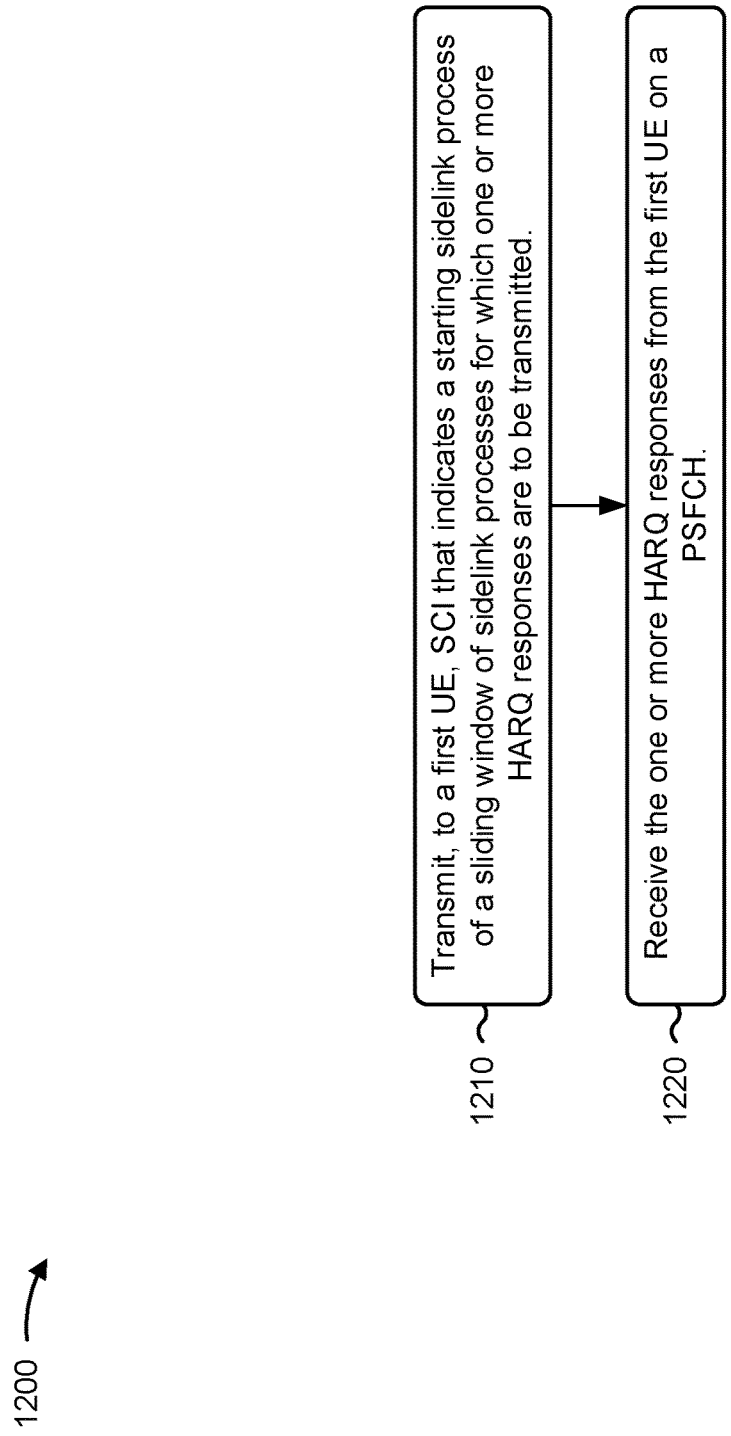
FIG. 12 is a diagram illustrating an example process performed, for example, by a second UE.
Figure 13:
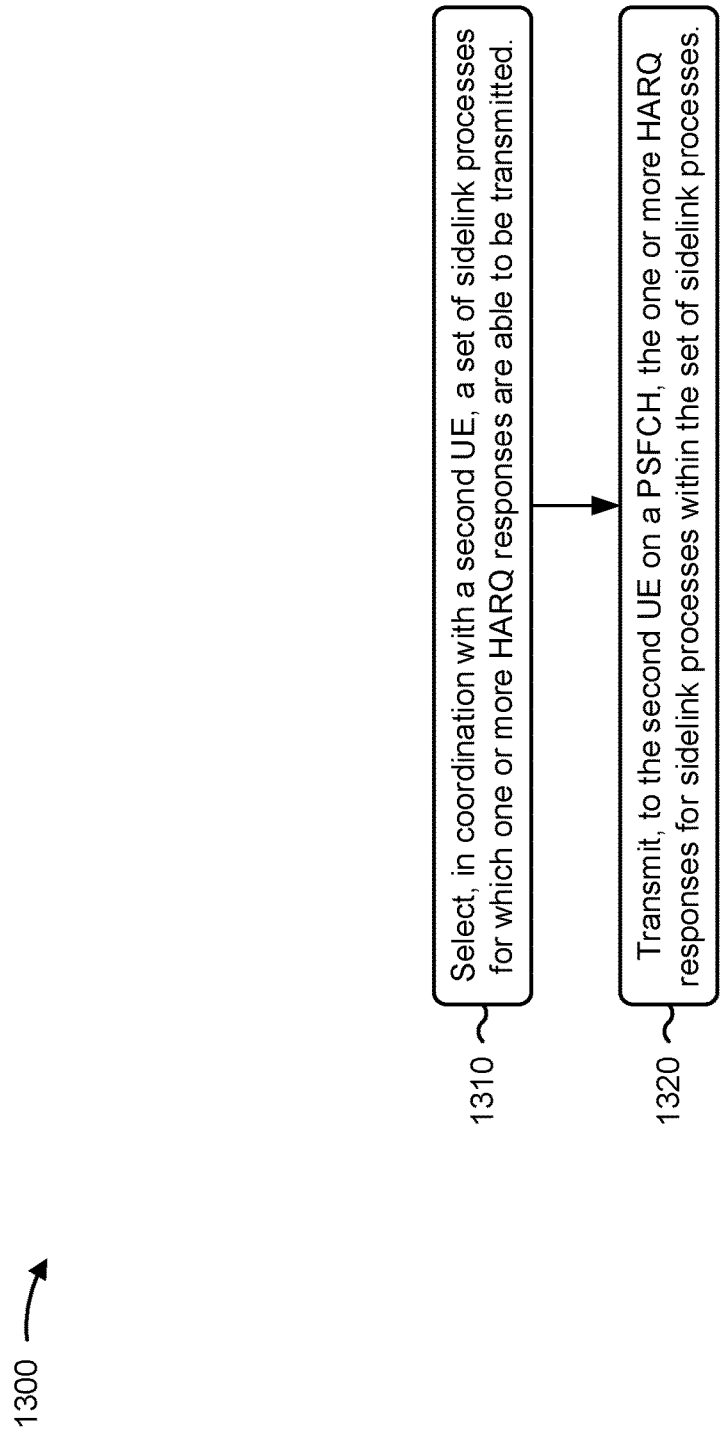
FIG. 13 is a diagram illustrating an example process performed, for example, by a first UE.
Figure 14:
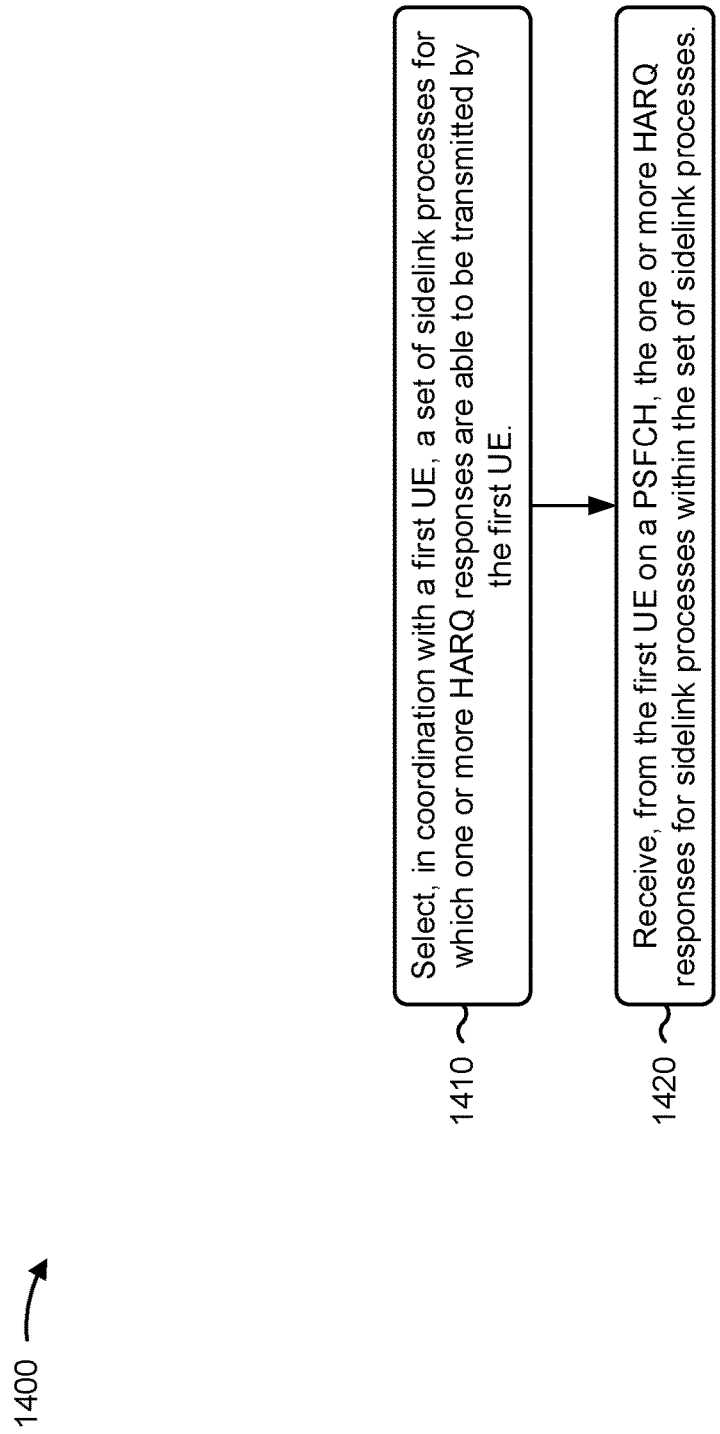
FIG. 14 is a diagram illustrating an example process performed, for example, by a second UE.

For example, the controller/processor 240 of the base station 110, the controller/processor 280 of the UE 120, or any other component(s) (or combinations of components) of FIG. 2 may perform or direct operations of, for example, process 1100 of FIG. 11, process 1200 of FIG. 12, process 1300 of FIG. 13, or process 1400 of FIG. 14. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1100 of FIG. 11, process 1200 of FIG. 12, process 1300 of FIG. 13, or process 1400 of FIG. 14, or other processes as described herein. In some examples, executing instructions may include running the instructions, converting the instructions, compiling the instructions, or interpreting the instructions.

In some aspects, the first UE includes means for receiving, from a second UE, SCI that indicates a starting sidelink process of a sliding window of sidelink processes for which one or more HARQ responses are to be transmitted, or means for transmitting the one or more HARQ responses to the second UE on a PSFCH. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the second UE includes means for transmitting, to a first UE, SCI that indicates a starting sidelink process of a sliding window of sidelink processes for which one or more HARQ responses are to be transmitted, or means for receiving the one or more HARQ responses from the first UE on a PSFCH. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first UE includes means for selecting, in coordination with a second UE, a set of sidelink processes for which one or more HARQ responses are able to be transmitted, or means for transmitting, to the second UE on a PSFCH, the one or more HARQ responses for sidelink processes within the set of sidelink processes. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the second UE includes means for selecting, in coordination with a first UE, a set of sidelink processes for which one or more HARQ responses are able to be transmitted by the first UE, or means for receiving, from the first UE on a physical PSFCH, the one or more HARQ responses for sidelink processes within the set of sidelink processes. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
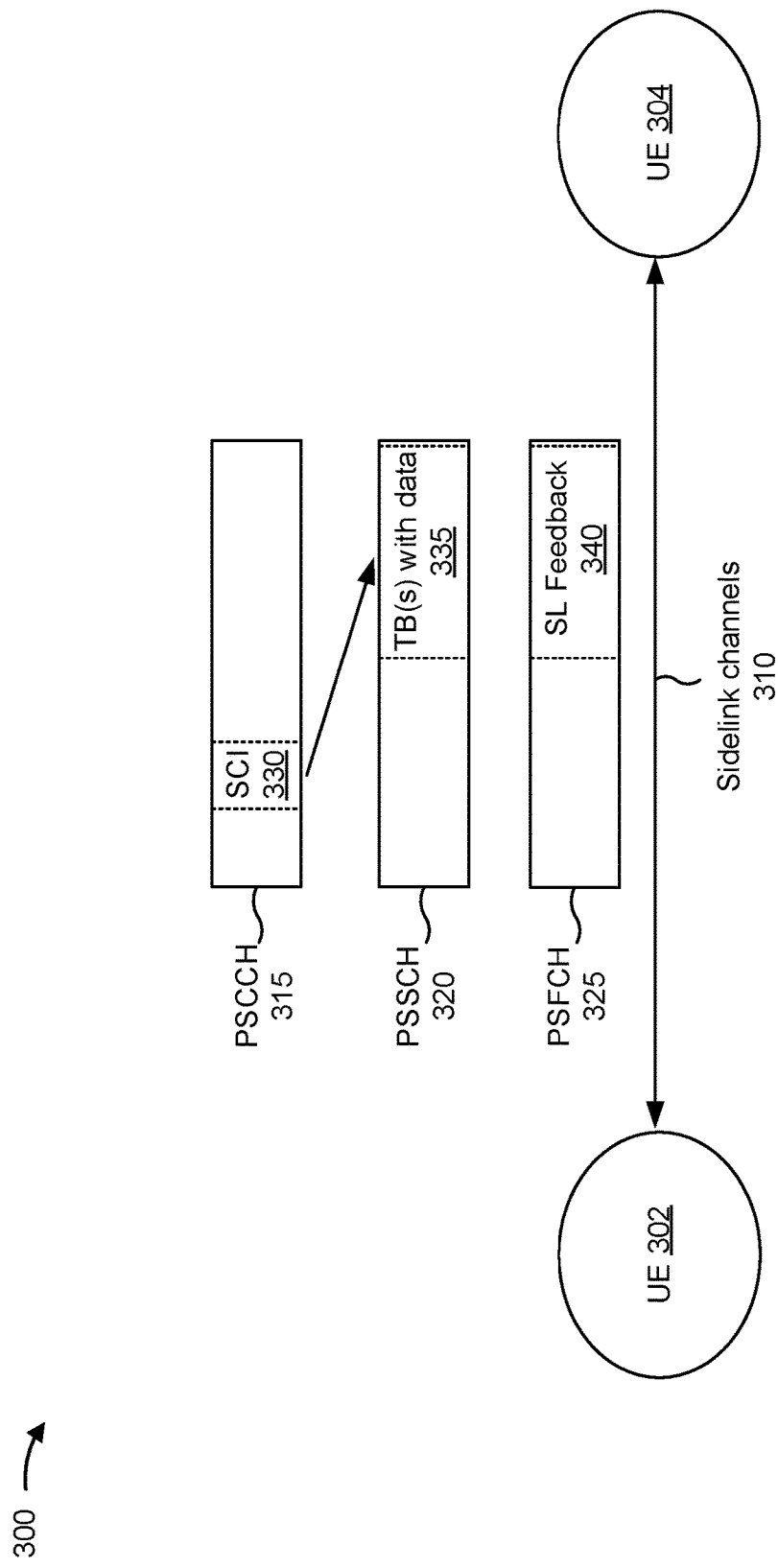
FIG. 3 is a diagram illustrating an example of sidelink communications.

FIG. 3 is a diagram illustrating an example 300 of sidelink communications. As shown in FIG. 3, a first UE 302 (such as UE 120a or UE 120e depicted in, and described in connection with, FIG. 1 and the UE 120 depicted in, and described in connection with, FIG. 2) may communicate with a second UE 304 (and one or more other UEs) (such as UE 120a or UE 120e depicted in, and described in connection with, FIG. 1 and UE 120 depicted in, and described in connection with, FIG. 2) via one or more sidelink channels 310. UE 302 and UE 304 may communicate using the one or more sidelink channels 310 for pedestrian-to-pedestrian (or peer-to-peer, P2P) communications, D2D communications, V2X communications (which may include V2V communications, V2I communications, or V2P communications) or mesh networking. In some aspects, UE 302 and UE 304 may correspond to one or more other UEs. In some aspects, the one or more sidelink channels 310 may use a PC5 interface or may operate in a high frequency band, such as the 5.9 gigahertz (GHz) band or higher. Additionally, or alternatively, UE 302 and UE 304 may synchronize timing of transmission time intervals (TTIs), such as frames, subframes, slots, or symbols, using, for example, global navigation satellite system (GNSS) timing, or other satellite system timing.

As further shown in FIG. 3, the one or more sidelink channels 310 may include a physical sidelink control channel (PSCCH) 315, a PSSCH 320, or a PSFCH 325. The PSCCH 315 may be used to communicate control information, similar to a physical downlink control channel (PDCCH) or a physical uplink control channel (PUCCH) used for cellular communications with a base station, such as base station 110, via an access link or an access channel. The PSSCH 320 may be used to communicate data, similar to a physical downlink shared channel (PDSCH) or a physical uplink shared channel (PUSCH) used for cellular communications with a base station via an access link or an access channel. For example, the PSCCH 315 may carry SCI 330, which may indicate various control information used for sidelink communications, such as one or more resources, such as time resources, frequency resources, or spatial resources, where a transport block (TB) 335 may be carried on the PSSCH 320. The TB 335 may include data, and SCI is usually transmitted with data. The PSFCH 325 may be used to communicate sidelink feedback 340, such as HARQ feedback (acknowledgement or negative acknowledgement (ACK/NACK) information), transmit power control (TPC), or a scheduling request (SR). UE 304 may transmit a request in SCI for a HARQ response. The UE 302 may receive the request and transmit the HARQ response over the PSFCH.

In some aspects, the one or more sidelink channels 310 may use resource pools. For example, a scheduling assignment (included in SCI 330) may be transmitted in subchannels using specific resource blocks (RBs) across time. In some aspects, data transmissions, such as on the PSSCH 320, associated with a scheduling assignment may occupy adjacent RBs in the same subframe as the scheduling assignment (using, for example, frequency division multiplexing (FDM)). In some aspects, a scheduling assignment and associated data transmissions are not transmitted on adjacent RBs.

In some aspects, UE 304 may operate using a transmission mode where resource selection or scheduling is performed by UE 302 (rather than a base station). In some aspects, UE 302 or UE 304 may perform resource selection or scheduling by sensing channel availability for transmissions. For example, UE 304 may measure an RSSI parameter, such as a sidelink-RSSI (S-RSSI) parameter, associated with various sidelink channels, may measure an RSRP parameter, such as a PSSCH-RSRP parameter, associated with various sidelink channels, may measure an RSRQ parameter, such as a PSSCH-RSRQ parameter, associated with various sidelink channels, or may determine a signal-to-interference ratio (SIR) associated with another UE on a sidelink channel. UE 304 may select a channel for transmission of a sidelink communication based on the measurement(s).

Additionally, or alternatively, UE 304 may perform resource selection or scheduling using SCI 330 received in the PSCCH 315, which may indicate occupied resources or channel parameters. Additionally, or alternatively, UE 304 may perform resource selection or scheduling by determining a channel busy ratio (CBR) associated with various sidelink channels, which may be used for rate control, such as by indicating a maximum number of resource blocks that UE 304 can use for a particular set of subframes.

In the transmission mode where resource selection or scheduling is performed by UE 302, UE 302 may generate sidelink grants, and may transmit the grants in SCI 330. A sidelink grant may indicate, for example, one or more parameters, such as transmission parameters, to be used for an upcoming sidelink transmission, such as one or more resource blocks to be used for the upcoming sidelink transmission on the PSSCH 320, such as for TBs 335, one or more subframes to be used for the upcoming sidelink transmission, or an MCS to be used for the upcoming sidelink transmission. In some aspects, UE 302 may generate a sidelink grant that indicates one or more parameters for semi-persistent scheduling (SPS), such as a periodicity of a sidelink transmission. Additionally, or alternatively, UE 302 may generate a sidelink grant for event-driven scheduling, such as for an on-demand sidelink message.

In sidelink resource allocation Mode 1 (in-coverage deployment), a base station may provide grants for sidelink channel access. UE 302 and UE 304 may operate in sidelink resource allocation Mode 2 (autonomous deployment), in which UE 302 and UE 304 schedule or reserve their own sidelink resources without the assistance or direction of the base station. UE 302 and UE 304 may perform sensing for distributed channel access. In some aspects, UE 302 may indicate available sidelink resources to UE 304, and UE 304 may select a sidelink resource for transmission from these available sidelink resources. UE 304 also may sense one or more of the sidelink channels 310 to identify, select or determine which sidelink resources are available. UE 304 may select a sidelink resource for transmission from the sidelink resources that UE 302 indicates as available or from the sidelink resources that UE 304 senses are available. In some aspects, UE 302 may schedule one or more suggested sidelink resources on behalf of UE 304.

Figure 4:
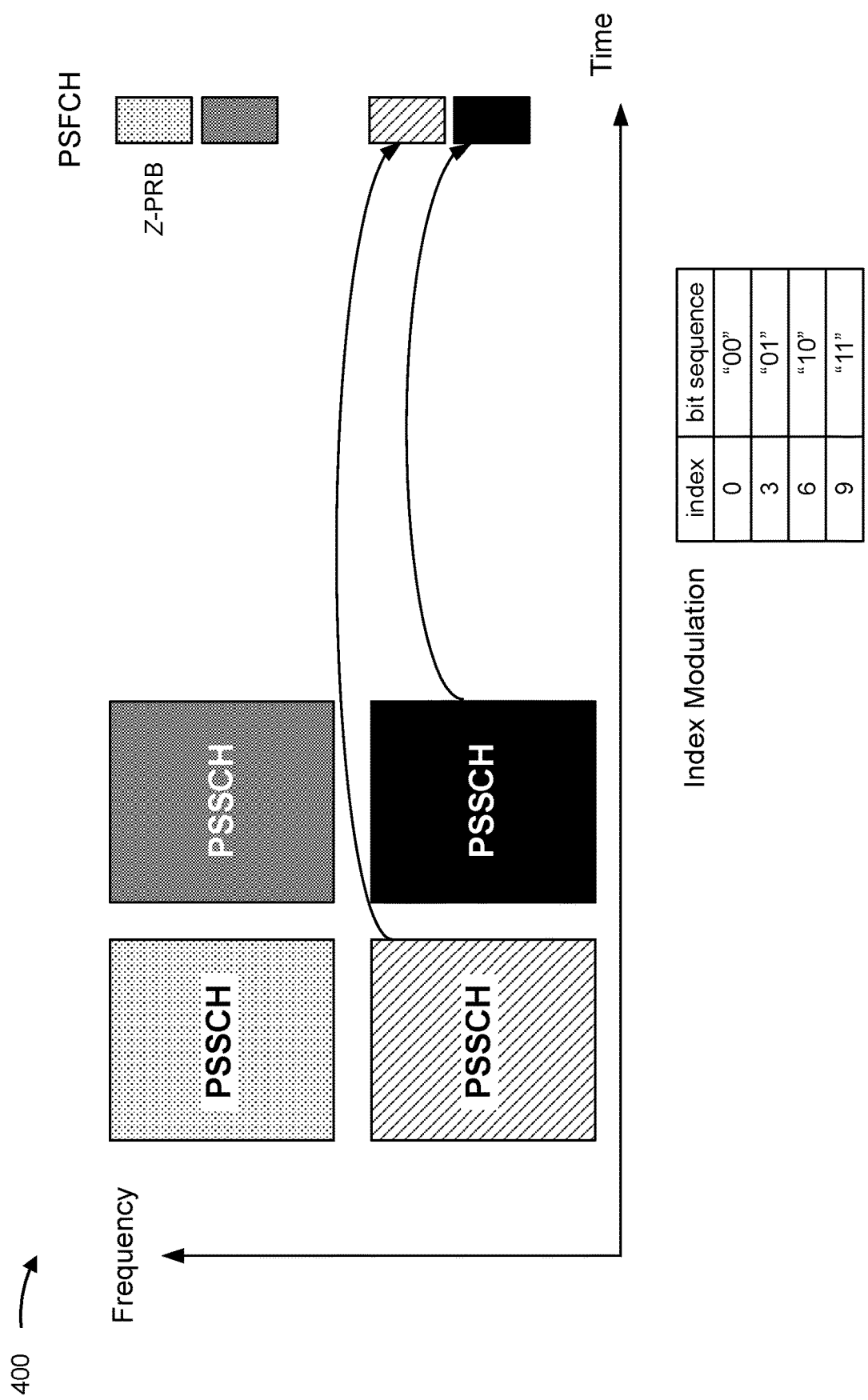
FIG. 4 is a diagram illustrating an example of mapping channels or sub-channels to physical resource blocks (PRBs).

FIG. 4 is a diagram illustrating an example 400 of mapping channels or sub-channels to physical resource blocks (PRBs). A transmitting UE may map sub-channels or PSSCHs to PRBs on the PSFCH. Each PRB may be referred to as a Z-PRB, where Z identifies the PRB from among other PRBs. A Z-PRB may include Y cyclic shifts (CSs) in a code domain, such as 1, 2, 3, 4, 6. Each CS may be considered a portion of the Z-PRB. In other words, a communication on the PSSCH may be mapped to one of Z*YPSFCH resources. The receiving UE may select a PSFCH resource with an index of (K+M)mod(Z*Y) for transmitting the communication over one of the Z-PRBs, where K is an 8-bit layer 1 (L1) source ID and M is set to a member ID for groupcast HARQ response option 2 (option 2 involves a respective response for different receivers). The member ID may be within {0, 1, ... X−1}, and groupcast HARQ response option 2 is not used when X is greater than (Z*Y). M is to be 0 otherwise. A first Z-PRB may correspond to a leading subchannel of the PSSCH.

Wireless communications may be used to serve different industries or services. Each of these industries or services may be considered a vertical domain. Public safety and vehicle-to-vehicle services may be examples of vertical domains that may use NR sidelink channels. NR sidelink also may be used for other vertical domains. However, not every vertical domain has access to a sub-6 GHz licensed band and may seek access in unlicensed bands. There may be about 1.8 GHz available in the 5 GHz/6 GHz unlicensed band and about 7 GHz available in the GHz unlicensed band. Wider bandwidths can create various deployment challenges. First, such challenges may include burst traffic instead of sporadic small packets, leading to a burst of HARQ responses. Second, wideband deployment via carrier aggregation may prefer control information over a primary carrier. Third, there may be fewer successful channel accesses in unlicensed band due to listen-before-talk (LBT). However, UEs may use only 1 bit of control signaling on the PSFCH per channel access. For example, a 1-bit HARQ response is carried by a computer-generated sequence (CGS) whose index is obtained from a hashing space with size Z*Y (large hashing space helps to suppress PSFCH collisions). The 1-bit HARQ response is sent without a grant in Mode 1 nor sensing in Mode 2. Without the ability to transmit more control information, deployment challenges may introduce latencies and cause UEs to consume more processing resources and signaling resources than is necessary.

In some aspects, UEs may use index modulation to convey more than 1 bit of control information on the PSFCH. Index modulation may include indicating an index that is pre-mapped to multiple control bits. For example, an index of 0 may represent control bits "00" and an index of 3 may represent control bits "01". The index values may be contiguous, non-contiguous, or may correspond to mod (Z*Y). For example, if mod(Z*Y)=0, the index modulated bit sequence may be "00 ... 00". If mod(Z*Y)=1, the index modulated bit sequence may be "00 ... 01". If mod(Z*Y) =Z*Y−1, the index modulated bit sequence may be "11 ... 11". While a PRB has been used by PUCCH format 0 to carry up to 3 bits with carefully chosen CSs, with index modulation, UE 302 may use index-modulated PSFCH to carry more bits, such as 3+[log$_2$ (Z)] bits. Encoding and decoding can be conducted under a current PSFCH framework.

By using an index that represents multiple control bits, UE 302 (such as UE 302 depicted in, and described in connection with, FIG. 3) may convey more control information. For example, instead of transmitting a single HARQ bit on the PSFCH, UE 302 may transmit an index value that corresponds to a HARQ codebook. The multiple control bits also may represent multiple types of control information, such as CQI, delta CQI, a scheduling request, or a combination thereof multiplexed together.

UE 302 may apply two-dimensional (frequency domain via PRB index and code domain via CS index) index modulation to deliver the multiple control bits. Prior to the use of index modulation, UE 302 may have selected an index of a PSFCH resource for transmission based on (K+M)mod(Z*Y), which was also used to determine respective bit sequences for acknowledgement (ACK) and negative acknowledgement (NACK). UE 302 may have used three-hypothesis detection to determine what is received among ACK, NACK, or discontinuous transmission (DTX). Using more than 3 hypotheses may consume a moderate amount of processing resources since PSFCH detection can be performed with simple frequency domain correlation.

UE 302 may transmit the index in a portion of a PRB on the PSFCH that avoids collision in the time and frequency domains with bits from another UE on the channel. For example, if a specified pool of PSFCH resources includes Z'-PRBs and Y'-CS per PRB, UE 302 may select the PSFCH resource (portion of a PRB) whose index is (K'+l)mod(Z' *Y'), where l is the index and K' is the 8-bit L1 ID of the PSFCH receiver or a constellation offset. PSFCH collisions may happen when more than two transmitting UEs are transmitting over the same subchannel and the UEs have spreads around the L1 ID that collide in the hashing space. The spread may be equal to the member size for groupcast HARQ response option 2, or to 1 otherwise. Applying index modulation to unicast does not increase the spread and thus there are no additional PSFCH collisions. In addition, the UEs may use more bits per channel access.

Figure 5:
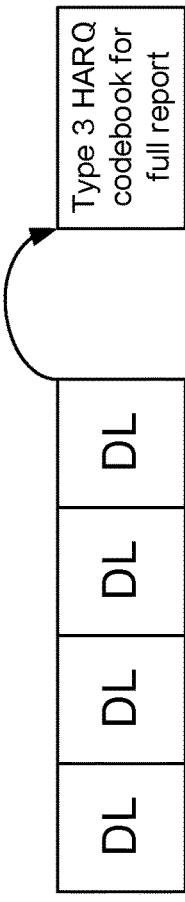
FIG. 5 is a diagram illustrating an example of a Type 3 hybrid automatic repeat request (HARQ) codebook.
Figure 5:
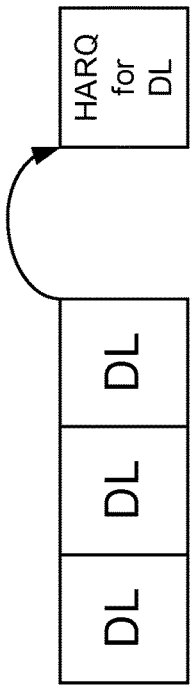

FIG. 5 is a diagram illustrating an example 500 of a Type 3 HARQ codebook. A UE may provide HARQ feedback to a base station for one or more HARQ processes. Example 500 shows 3 downlink (DL) messages on the PDSCH and HARQ feedback that is to be transmitted for a DL message. However, if the base station does not receive the HARQ feedback, the base station may request a HARQ codebook indicating HARQ feedback for multiple (or all) downlink HARQ processes in one full HARQ report (one-shot feedback). The base station may include the request in a DL grant. The UE may transmit the one-shot feedback over a Uu link as a Type 3 HARQ codebook. Example 500 shows a Type 3 HARQ codebook for the full HARQ report. The full HARQ report may be for all carriers configured for the UE in a physical uplink control channel (PUCCH) group. The UE may use a bitmap to transmit the Type 3 HARQ codebook. The UE also may transmit the Type 3 HARQ codebook over a sidelink for unlicensed bands. The UE may transmit the Type 3 HARQ codebook in SCI, over multiple PSFCH opportunities, or by using index modulation.

PSFCH has limited capacity for providing HARQ feedback, even if index modulation is used. For example, a Type 3 HARQ codebook may involve 16 HARQ processes, but the PSFCH capacity may not provide for 16 HARQ processes. The PSFCH capacity also may vary in time, depending on a number of subchannels that are occupied. If the PSFCH capacity is not sufficient or is underutilized, HARQ feedback may be delayed and such delay may cause the UE to consume additional processing resources and signaling resources.

Figure 6:
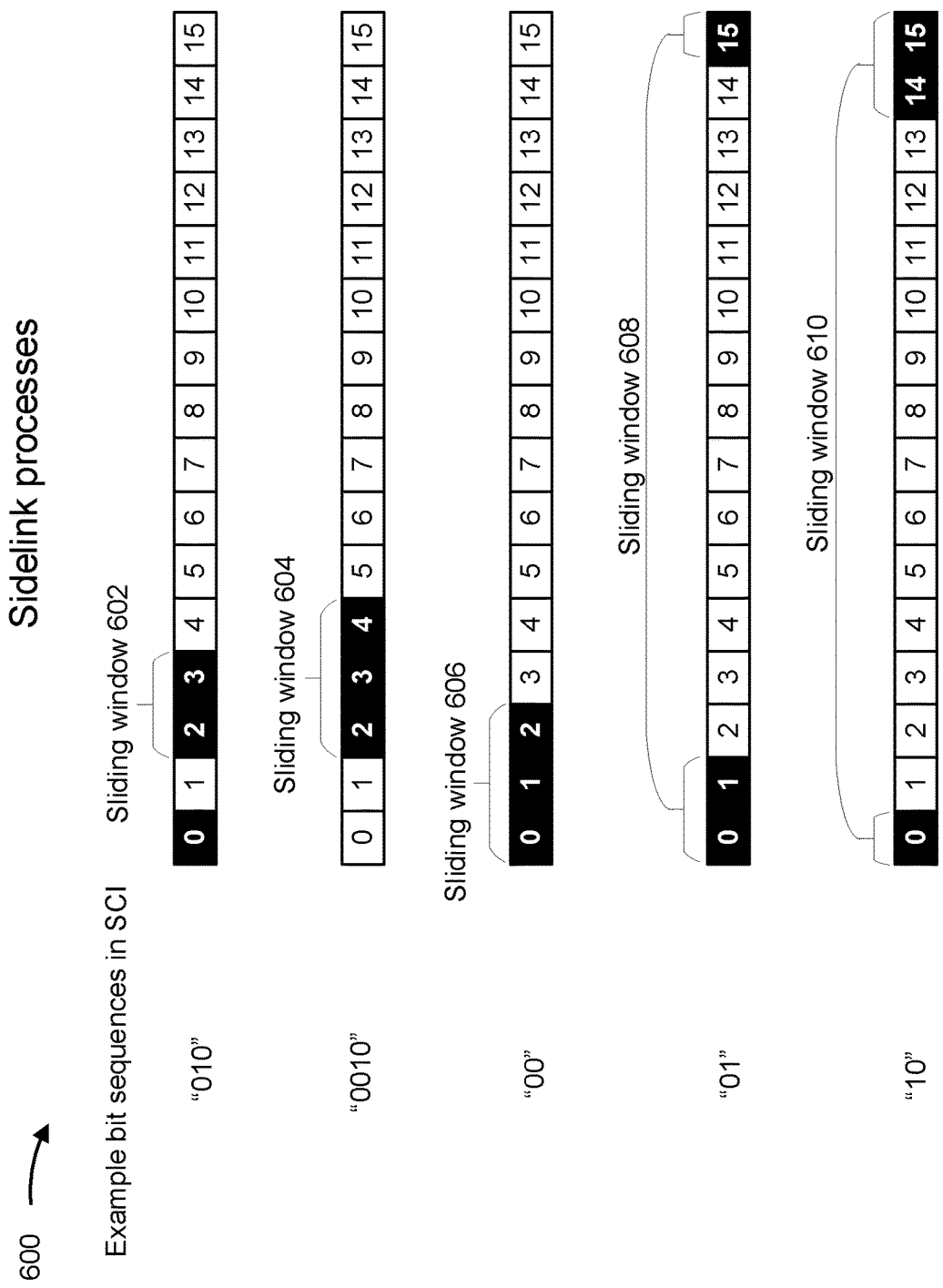
FIG. 6 is a diagram illustrating an example of sliding windows of sidelink processes

FIG. 6 is a diagram illustrating an example 600 of sliding windows of sidelink processes. According to various aspects described herein, a UE may request HARQ responses for a set of sidelink processes by inserting polling information in SCI. For example, a second UE may have 2 TBs to be transmitted on a sidelink to a first UE. If the first UE failed to receive a HARQ response for sidelink process 0, when transmitting the second TB using sidelink process 1, the first UE may request HARQ responses in SCI for both sidelink process 0 and sidelink process 1. The set of sidelink processes may be a subset of a full list of sidelink processes (the subset has fewer sidelink processes than the full list of sidelink processes).

In some aspects, to indicate multiple sidelink processes, the first UE may indicate a window of sidelink processes. The window may be a sliding window that starts with a starting sidelink process and extends through other sidelink processes. Example 600 shows multiple sliding windows 602, 604, 606, 608, and 610. The first UE may use m bits to indicate a sliding window. The PSFCH may have a bit capacity of m bits. The PSFCH capacity may be determined based on Layer 2 or Layer 3 hand-shaking and based on a quantity of subchannels occupied by the second UE in transmitting PSSCH communications. Example 600 shows 16 possible sidelink processes and thus 4 bits may be used to indicate a sliding window (PSFCH capacity may be 4 bits). While 16 possible sidelink processes are shown in example 600, there may be more than 16 sidelink processes and thus more than 4 bits may be used. The PSFCH capacity of a subchannel of the PSSCH may be boosted to m bits. Using an index modulation based codebook, the PSFCH may carry $m+\log_2(s)$ bits for a PSSCH occupying s subchannels.

In some aspects, a current sidelink process 0 is polled (requested) and m−1 bits may be used to indicate sliding window 602. The m−1 bits (3 bits) may include "010" to indicate sidelink process ID 2 as the starting sidelink process. That is, HARQ responses for sidelink process IDs {0, 2, 3} may be polled over an m bit capacity PSFCH. The sidelink processes of a sliding window may be contiguous. If sidelink process 0 is polled, sidelink process 0 may be considered a first part of the sidelink window and sidelink processes 2 and 3 may be considered a remainder of the sliding window.

In some aspects, a current sidelink process 0 is not polled and m bits (3 bits) "0010" are used in SCI to indicate sliding window 604 for a 3 bit capacity PSFCH. Sliding window 604 may include sidelink processes {2, 3, 4}.

In some aspects, the first UE and the second UE may agree to a fixed m, and the SCI may carry a $\log_2(m)$ bit sequence requesting HARQ responses for sidelink processes within an m-length sliding window. The sliding window may include a current sidelink process for a current PSSCH communication. This may help to reduce a size of m. For example, sliding window 606 includes a current process 0 and two more sidelink processes (bit sequence "00").

While sliding window 606 shows contiguous sidelink processes, sliding window 608 shows non-contiguous sidelink processes. The bit sequence may indicate a set of sidelink processes, whether contiguous or non-contiguous. For example, sliding window 608 may include a current sidelink process 0 and 2-bit sequence "01" indicates that sliding window 608 also includes sidelink processes 1 and 15. The 2-bit sequence may be an index or may otherwise indicate a particular sliding window (set of processes). The 2-bit sequence may be one of multiple sequences stored in a table, for example, where a unique 2-bit sequence corresponds to a unique sliding window. Similarly, for sidelink window 610, 2-bit sequence "10" indicates sidelink processes 14 and 15.

Figure 7:
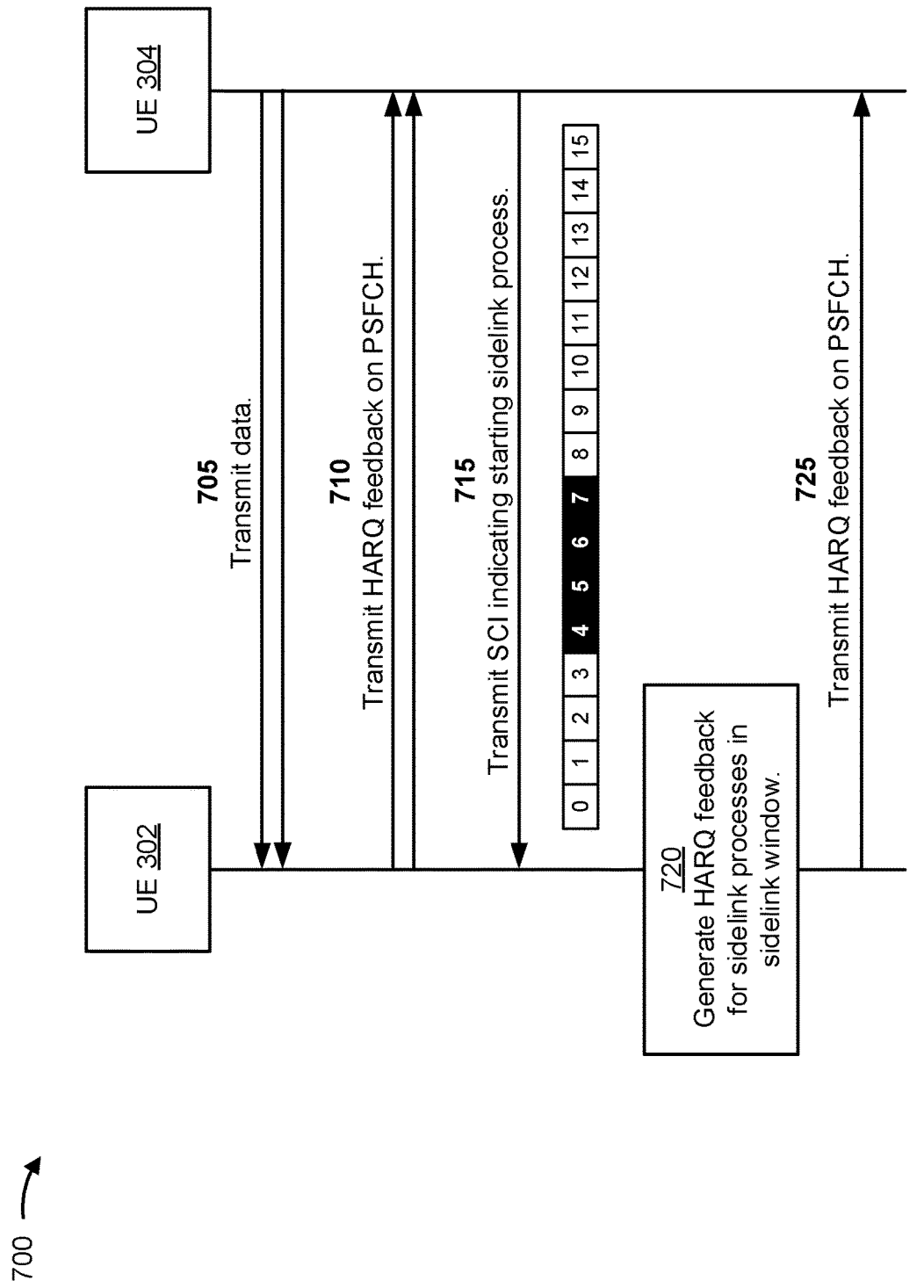
FIG. 7 is a diagram illustrating an example of using a bit sequence to indicate a sliding window.

FIG. 7 is a diagram illustrating an example 700 of using a bit sequence to indicate a sliding window. Example 700 shows that UE 302 and UE 304 (depicted in, and described in connection with, FIGS. 3 and 4) may communicate with one another over sidelink channels. UE 302 and UE 304 operate within a wireless network, such as wireless network 100. UE 304 may be a UE that transmits data on the PSSCH. UE 302 may be a UE that receives data on the PSSCH and transmits feedback on the PSFCH. UE 304 may request and receive the feedback.

As shown by reference number 705, UE 304 may transmit data to UE 302. The data may include multiple PSSCH communications, where each PSSCH communication is associated with a sidelink process. As shown by reference number 710, UE 302 may transmit HARQ feedback on a PSFCH for sidelink processes 0-3 and 8-15. However, HARQ feedback for sidelink processes 4-7 may not have been received. Accordingly, UE 304 may transmit a request for Type 3 HARQ codebook. As shown by reference number 715, UE 304 may transmit the request in SCI, where the request indicates a sliding window of sidelink processes 4-7. The UE 304 may use 3 bits ("100") to indicate that the starting sidelink process of the sliding window is sidelink process 4. By configuration, UE 302 may determine that the sliding window is to be 5 sidelink processes in length. While UE 302 transmits HARQ feedback for processes 0-15 in example 700, UE 302 may transmit HARQ feedback for fewer processes.

As shown by reference number 720, UE 302 may generate a HARQ codebook for sidelink processes 4-7. As shown by reference number 725, UE 302 may transmit the HARQ codebook on the PSFCH based on a bit capacity of the PSFCH. For example, UE 302 may transmit an index that indicates a longer bit sequence such that UE 302 provides UE 304 HARQ feedback for sidelink processes 4-7.

FIG. 8 is a diagram illustrating an example 800 of sets of polled sidelink processes. In some aspects, UE 304 (depicted in, and described in connection with, FIGS. 3, 4 and 7) may transmit a bit sequence in the SCI that identifies a set of sidelink processes. The set of sidelink processes may include contiguous sidelink processes in a sliding window or non-contiguous sidelink processes. Example 800 shows bit sequences, such as 4-bit sequences, that indicate a set of polled sidelink processes. The size of the set of sidelink processes may vary based on a bit capacity of the PSFCH. For example, a bit sequence of "1100" indicates 2 sidelink processes {8, 9} for a PSFCH bit capacity of 2 bits, while a bit sequence of "0001" indicates all 16 sidelink processes {0-15} for a PSFCH bit capacity of 16 bits. Other sequences shown in example 800 may be for 1 bit, 4 bits, or 8 bits. The sidelink processes in example 800 may be divided as if the sets of sidelink processes were organized into a binary tree. A binary tree involves a data structure or an organization of data points (nodes) in such a way that each layer of the binary tree may be split in half (each node has at most 2 children). A path of data point selection may follow one of two paths in each layer based on a value that is being applied to the binary tree. For example, for a PSFCH bit capacity of 4 bits, a set of sidelink processes may be found by splitting the 16 sidelink processes in half ({0-7} and {8-15}) and then splitting an 8-process half further into two 4-process halves ({8-11} and {12-15}). If a PSFCH capacity n is 1, 2, 4, 8, or 16, the quantity of a candidate set of sidelink processes (or candidate sliding windows) may be equal to 16 divided by n. Example 800 shows that for 1 bit, there are 16 possible sets (sliding windows). For 2 bits, there are 8 sets. For 4 bits, there are 4 sets. For 8 bits, there are 2 sets. For 16 bits, there is 1 set. If n is 4, 8, or 16, the quantity of bits m that are used is 3. If n is 4, m is 2.

In some aspects, UE 302 and UE 304 may select a set of sidelink processes for which HARQ responses are to be transmitted. UE 302 and UE 304 may coordinate with each other to select the set of sidelink processes within which UE 304 may transmit data, and UE 302 may transmit HARQ feedback. For example, UE 304 may transmit a set of sidelink processes, and UE 302 may adopt the set of sidelink processes, reject the set of sidelink processes, or modify the set of sidelink processes. UE 302 and UE 304 may negotiate to establish the set of sidelink processes. That is, UE 302 and UE 304 may identify an agreed upon set of sidelink processes and both adopt the set of sidelink processes. UE 304 may use sidelink processes that are in the agreed set of sidelink processes for data transmission and not use sidelink processes that are outside the agreed set of sidelink processes. UE 302 may transmit HARQ feedback for sidelink processes that are in the agreed set of sidelink processes and not transmit HARQ feedback for sidelink processes that are outside the agreed set of sidelink processes.

If the set of sidelink processes is less than a full list of sidelink processes, such as all 16 sidelink processes, the HARQ codebook generated for the set of sidelink processes may be considered a partial Type 3 HARQ codebook. This may involve UE 302 transmitting a request or suggested set of sidelink processes and UE 304 responding with a confirmation, a rejection, or a modification of the set of sidelink processes. Both UE 302 and UE 304 may either transmit a request or transmit a response. There may be an additional confirmation step, if necessary, to confirm a modification or to indicate confirmation of a response. UE 302 may transmit HARQ feedback corresponding to sidelink processes in the set of sidelink processes.

If a set of sidelink processes is established between UE 302 and UE 304, UE 302 may transmit HARQ feedback for all sidelink processes in the set of sidelink processes if UE 302 is triggered to use the set of sidelink processes. UE 302 may be triggered by receiving SCI indicating that the set of sidelink processes is to be used. Alternatively, UE 302 may transmit HARQ feedback for all sidelink processes in the set of sidelink processes independent of whether UE 302 receives SCI indicating that the set of sidelink processes is to be used. That is, UE 302 may transmit HARQ feedback for all sidelink processes in the set of sidelink processes even if UE 302 does not receive an indication to use the set of sidelink processes. This may occur because the set of sidelink processes was already established (negotiated or pre-agreed) between UE 302 and UE 304 in earlier SCI or other sidelink signaling. The partial Type 3 codebook, or other codebook used, may be as effective as a full Type 3 codebook, including for unlicensed bands.

Figure 9:
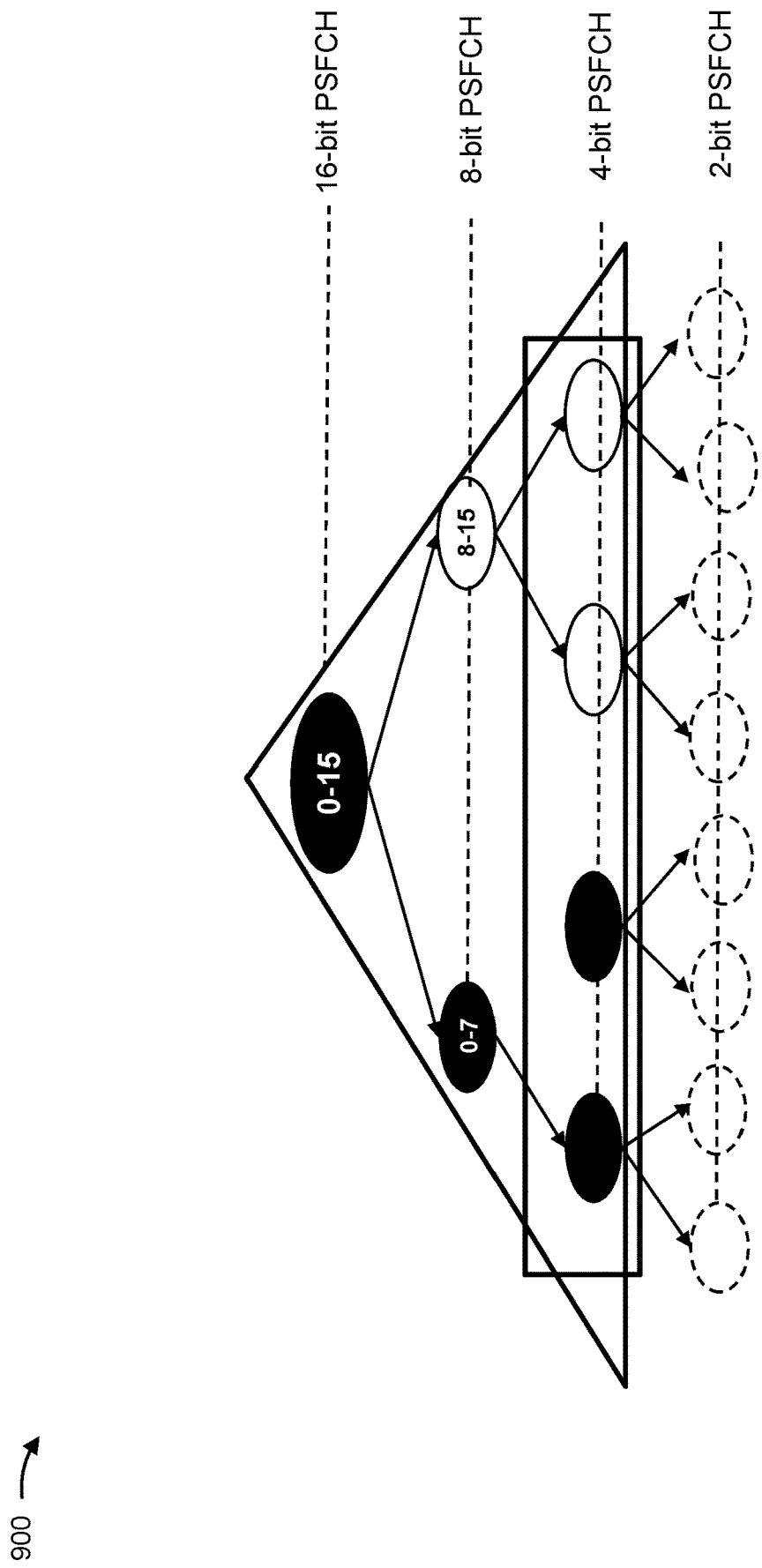
FIG. 9 is a diagram illustrating an example of control sequences.

FIG. 9 is a diagram illustrating an example 900 of control sequences. Example 900 shows possible control sequences organized as if in a binary tree. If UE 302 and UE 304 (depicted in, and described in connection with, FIGS. 3-4 and 7-8) are able to establish a PSFCH bit capacity, UE 302 and UE 304 may specify a subset of sidelink processes that may be indicated with fewer bits. For example, sets of sidelink processes may be comparable to nodes of a binary tree. If UE 302 and UE 304 agree to a PSFCH capacity of 4 bits, 8 bits, or 16 bits, a 3-bit control sequence may be used to encode 7 sets of sidelink processes, such as the 7 nodes shown in the triangle of example 900. If UE 302 and UE 304 agree to a PSFCH capacity of exactly 4 bits, one of 4 2-bit control sequences may be used, such as the 4 nodes shown in the rectangle of example 900.

Figure 10:
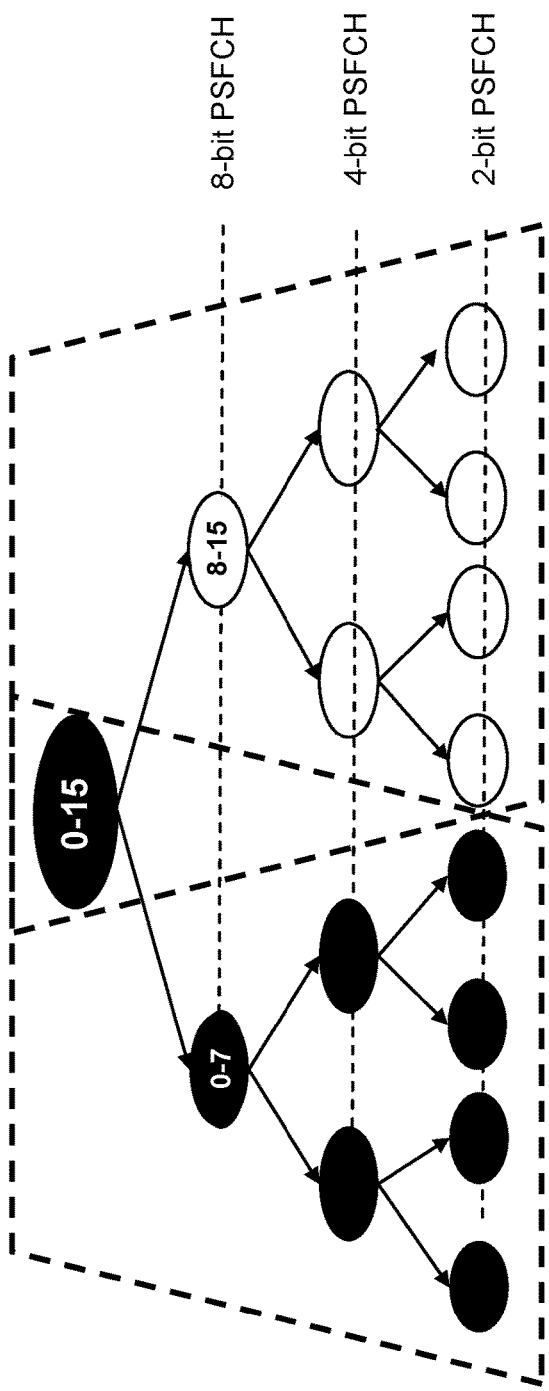
FIG. 10 is a diagram illustrating another example of control sequences.

FIG. 10 is a diagram illustrating an example 1000 of control sequences. Example 1000 shows possible control sequences organized as if in a binary tree. If UE 302 and UE 304 (depicted in, and described in connection with, FIGS. 3-4 and 7-9) are able to establish a PSFCH bit capacity, UE 302 and UE 304 may specify a subset of sidelink processes that may be indicated with fewer bits. Example 1000 shows two parallelograms, each containing 8 nodes where a 3-bit control sequence is enough to indicate a set of sidelink processes. UE 302 and UE 304 may agree that the candidate sets of sidelink processes in the first parallelogram may be used if a current sidelink process ID is smaller than 8 and that the candidate sets of sidelink processes in the second parallelogram may be used if a current sidelink process ID is equal to or greater than 8. In this way, a binary tree structure may be used to compress a size of a control sequence that is used to indicate a set of sidelink processes from among multiple candidate sets of sidelink processes. By reducing a quantity of bits that are used to indicate sidelink processes for Type 3 codebook or partial Type 3 codebook, UE 302 and UE 304 may save signaling resources when using SCI and the PSFCH.

FIG. 11 is a diagram illustrating an example process 1100 performed, for example, by a first UE. The process 1100 is an example where the UE, such as UE 302, performs operations associated with transmitting sidelink feedback.

As shown in FIG. 11, in some aspects, the process 1100 may include receiving, from a second UE, SCI that indicates a starting sidelink process of a sliding window of sidelink processes for which one or more HARQ responses are to be transmitted (block 1110). For example, the UE (such as by using communication manager 140 or reception component 1502 depicted in FIG. 15) may receive, from a second UE, SCI that indicates a starting sidelink process of a sliding window of sidelink processes for which one or more HARQ responses are to be transmitted.

As shown in FIG. 11, in some aspects, the process 1100 may include transmitting the one or more HARQ responses to the second UE on a PSFCH (block 1120). For example, the UE (such as by using communication manager 140 or transmission component 1504 depicted in FIG. 15) may transmit the one or more HARQ responses to the second UE on a PSFCH.

The process 1100 may include additional aspects, such as any single aspect or any combination of aspects described in connection with the process 1100 or in connection with one or more other processes described elsewhere herein.

In a first additional aspect, the SCI indicates the starting sidelink process with m bits, and m bits is a bit capacity of the PSFCH. In a second additional aspect, alone or in combination with the first aspect, m is 4.

In a third additional aspect, alone or in combination with one or more of the first and second aspects, a HARQ response is requested for a current sidelink process, and m−1 bits indicate the starting sidelink process for a remainder of the sliding window.

In a fourth additional aspect, alone or in combination with one or more of the first through third aspects, a HARQ response is not requested for a current sidelink process, where the SCI indicates the starting sidelink process with m−1 bits, and m bits is a bit capacity of the PSFCH. In a fifth additional aspect, alone or in combination with one or more of the first through fourth aspects, m is 3.

In a sixth additional aspect, alone or in combination with one or more of the first through fifth aspects, m is a specified value stored at the first UE, and the SCI indicates the starting sidelink process with a $\log_2(m)$-bit control sequence.

In a seventh additional aspect, alone or in combination with one or more of the first through sixth aspects, the SCI indicates the sliding window with m bits, and the sliding window is one of multiple candidate sliding windows that are each associated with a bit capacity n of the PSFCH. In an eighth additional aspect, alone or in combination with one or more of the first through seventh aspects, n is 1, 2, 4, 8, or 16, and a quantity of candidate sidelink windows for a value of n is equal to 16 divided by n. In a ninth additional aspect, alone or in combination with one or more of the first through eighth aspects, a quantity of sidelink processes in the sliding window is equal to n.

In a tenth additional aspect, alone or in combination with one or more of the first through ninth aspects, n is specified between the first UE and the second UE. In an eleventh additional aspect, alone or in combination with one or more of the first through tenth aspects, m is 3 if n is 4, 8, or 16. In a twelfth additional aspect, alone or in combination with one or more of the first through eleventh aspects, m is 2 if n is 4.

In a thirteenth additional aspect, alone or in combination with one or more of the first through twelfth aspects, the multiple candidate sliding windows are divided into a first half and a second half, and the indicated sidelink window is from either the first half or the second half based on a current sidelink process. In a fourteenth additional aspect, alone or in combination with one or more of the first through thirteenth aspects, m is 3, and the first half and the second half each include 8 sets of sidelink processes.

Although FIG. 11 shows example blocks of the process 1100, in some aspects, the process 1100 may include additional blocks, fewer blocks, different blocks, or differently arranged blocks than those depicted in FIG. 11. Additionally, or alternatively, two or more of the blocks of the process 1100 may be performed in parallel.

FIG. 12 is a diagram illustrating an example process 1200 performed, for example, by a second UE. The process 1200 is an example where the UE, such as UE 304, performs operations associated with indicating sidelink processes for sidelink feedback.

As shown in FIG. 12, in some aspects, the process 1200 may include transmitting, to a first UE, SCI that indicates a starting sidelink process of a sliding window of sidelink processes for which one or more HARQ responses are to be transmitted (block 1210). For example, the UE (such as by using communication manager 140 or transmission component 1604 depicted in FIG. 16) may transmit, to a first UE, SCI that indicates a starting sidelink process of a sliding window of sidelink processes for which one or more HARQ responses are to be transmitted.

As shown in FIG. 12, in some aspects, the process 1200 may include receiving the one or more HARQ responses from the first UE on a PSFCH (block 1220). For example, the UE (such as by using communication manager 140 or reception component 1602 depicted in FIG. 16) may receive the one or more HARQ responses from the first UE on a PSFCH.

The process 1200 may include additional aspects, such as any single aspect or any combination of aspects described in connection with the process 1200 or in connection with one or more other processes described elsewhere herein.

In a first additional aspect, the SCI indicates the starting sidelink process with m bits, and m bits is a bit capacity of the PSFCH. In a second additional aspect, alone or in combination with the first aspect, m is 4. In a third additional aspect, alone or in combination with one or more of the first and second aspects, a HARQ response is requested for a current sidelink process, and m−1 bits indicate the starting sidelink process for a remainder of the sliding window.

In a fourth additional aspect, alone or in combination with one or more of the first through third aspects, a HARQ response is not requested for a current sidelink process, where the SCI indicates the starting sidelink process with m−1 bits, and m bits is a bit capacity of the PSFCH. In a fifth additional aspect, alone or in combination with one or more of the first through fourth aspects, m is 3.

In a sixth additional aspect, alone or in combination with one or more of the first through fifth aspects, m is a specified value stored at the first UE, and the SCI indicates the starting sidelink process with a $\log_2(m)$-bit control sequence.

In a seventh additional aspect, alone or in combination with one or more of the first through sixth aspects, the SCI indicates the sliding window with m bits, and the sliding window is one of multiple candidate sliding windows that are each associated with a bit capacity n of the PSFCH.

In an eighth additional aspect, alone or in combination with one or more of the first through seventh aspects, n is 1, 2, 4, 8, or 16, and a quantity of candidate sidelink windows for a value of n is equal to 16 divided by n. In a ninth additional aspect, alone or in combination with one or more of the first through eighth aspects, a quantity of sidelink processes in the sliding window is equal to n. In a tenth additional aspect, alone or in combination with one or more of the first through ninth aspects, n is specified between the first UE and the second UE. In an eleventh additional aspect, alone or in combination with one or more of the first through tenth aspects, m is 3 if n is 4, 8, or 16. In a twelfth additional aspect, alone or in combination with one or more of the first through eleventh aspects, m is 2 if n is 4.

In a thirteenth additional aspect, alone or in combination with one or more of the first through twelfth aspects, the multiple candidate sliding windows are divided into a first half and a second half, and the indicated sidelink window is from either the first half or the second half based on a current sidelink process. In a fourteenth additional aspect, alone or in combination with one or more of the first through thirteenth aspects, m is 3, and the first half and the second half each include 8 sets of sidelink processes.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

FIG. 13 is a diagram illustrating an example process 1300 performed, for example, by a UE. The process 1300 is an example where the UE, such as UE 302, performs operations associated with selecting sidelink processes for sidelink feedback.

As shown in FIG. 13, in some aspects, the process 1300 may include selecting, in coordination with a second UE, a set of sidelink processes for which one or more HARQ responses are able to be transmitted (block 1310). For example, the UE (such as by using communication manager 140 or establishment component 1708 depicted in FIG. 17) may select, in coordination with a second UE, a set of sidelink processes for which one or more HARQ responses are able to be transmitted.

As shown in FIG. 13, in some aspects, the process 1300 may include transmitting, to the second UE on a PSFCH, the one or more HARQ responses for sidelink processes within the set of sidelink processes (block 1320). For example, the UE (such as by using communication manager 140 or transmission component 1704 depicted in FIG. 17) may transmit, to the second UE on a PSFCH, the one or more HARQ responses for sidelink processes within the set of sidelink processes.

The process 1300 may include additional aspects, such as any single aspect or any combination of aspects described in connection with the process 1300 or in connection with one or more other processes described elsewhere herein.

In a first additional aspect, the transmitting includes transmitting, independent of receiving sidelink control information associated with HARQ, HARQ responses for all sidelink processes in the set of sidelink processes.

In a second additional aspect, alone or in combination with the first aspect, the transmitting includes transmitting, in connection with receiving sidelink control information associated with HARQ, HARQ responses for all sidelink processes in the set of sidelink processes.

Although FIG. 13 shows example blocks of the process 1300, in some aspects, the process 1300 may include additional blocks, fewer blocks, different blocks, or differently arranged blocks than those depicted in FIG. 13. Additionally, or alternatively, two or more of the blocks of the process 1300 may be performed in parallel.

FIG. 14 is a diagram illustrating an example process 1400 performed, for example, by a UE. The process 1400 is an example where the UE, such as UE 304, performs operations associated with selecting sidelink processes for sidelink feedback.

As shown in FIG. 14, in some aspects, the process 1400 may include selecting, in coordination with a first UE, a set of sidelink processes for which one or more HARQ responses are able to be transmitted by the first UE (block 1410). For example, the UE (such as by using communication manager 140 or selection component 1808 depicted in FIG. 18) may select, in coordination with a first UE, a set of sidelink processes for which one or more HARQ responses are able to be transmitted by the first UE.

As shown in FIG. 14, in some aspects, the process 1400 may include receiving, from the first UE on a PSFCH, the one or more HARQ responses for sidelink processes within the set of sidelink processes (block 1420). For example, the UE (such as by using communication manager 140 or reception component 1802 depicted in FIG. 18) may receive, from the first UE on a PSFCH, the one or more HARQ responses for sidelink processes within the set of sidelink processes.

The process 1400 may include additional aspects, such as any single aspect or any combination of aspects described in connection with the process 1400 or in connection with one or more other processes described elsewhere herein.

In a first additional aspect, the receiving includes receiving HARQ responses for all sidelink processes in the set of sidelink processes.

In a second additional aspect, alone or in combination with the first aspect, the process 1400 includes transmitting sidelink control information that requests HARQ responses for the set of sidelink processes.

Although FIG. 14 shows example blocks of the process 1400, in some aspects, the process 1400 may include additional blocks, fewer blocks, different blocks, or differently arranged blocks than those depicted in FIG. 14. Additionally, or alternatively, two or more of the blocks of the process 1400 may be performed in parallel.

Figure 15:
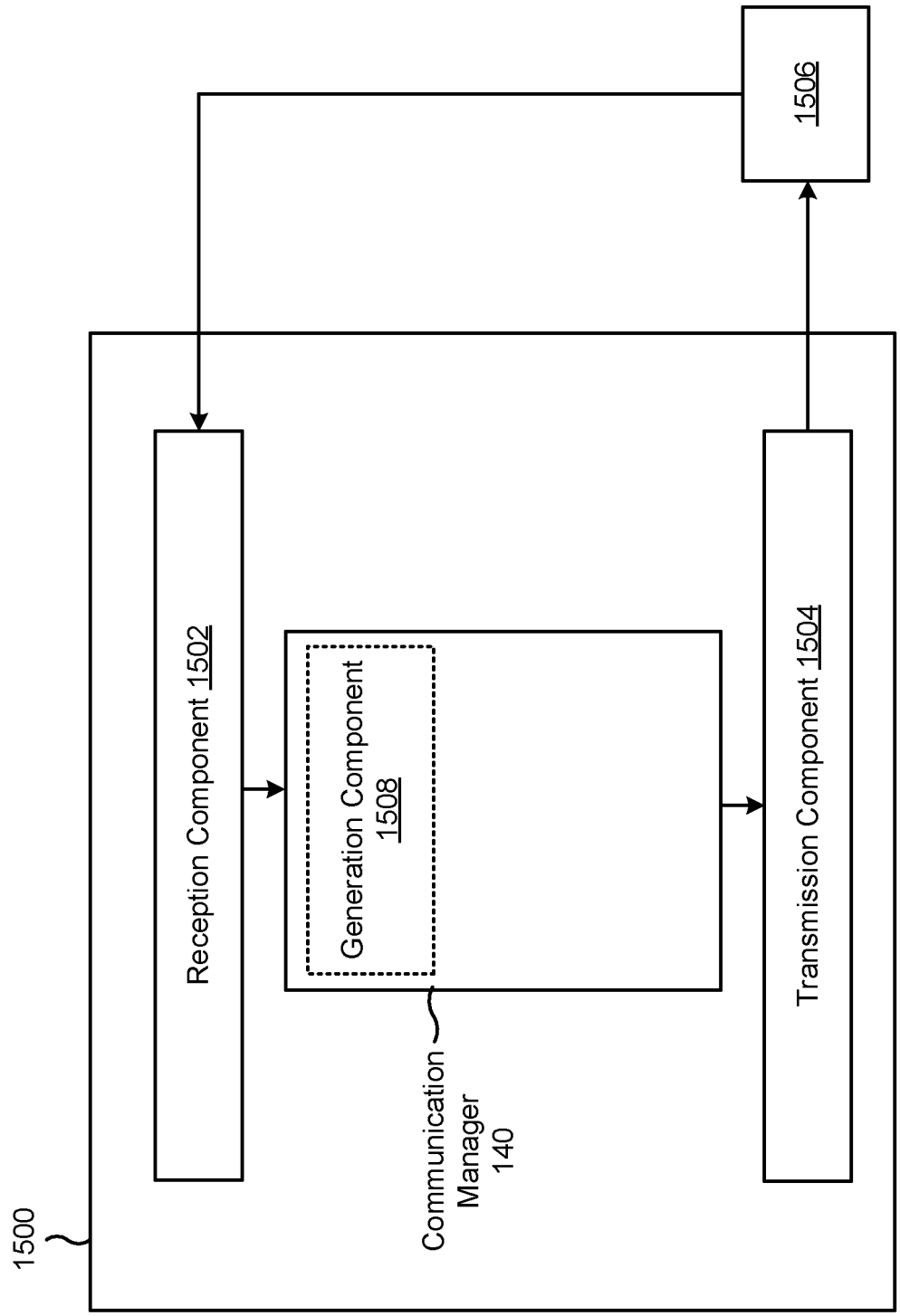
FIGS. 15-18 are diagrams of example apparatuses for wireless communication.

FIG. 15 is a diagram of an example apparatus 1500 for wireless communication. The apparatus 1500 may be a first UE, such as UE 302, or a first UE may include the apparatus 1500. In some aspects, the apparatus 1500 includes a reception component 1502 and a transmission component 1504, which may be in communication with one another (for example, via one or more buses or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a generation component 1508, among other examples.

In some aspects, the apparatus 1500 may be configured to perform one or more operations described herein in connection with FIGS. 1-10. Additionally, or alternatively, the apparatus 1500 may be configured to perform one or more processes described herein, such as process 1100 of FIG. 11. In some aspects, the apparatus 1500 or one or more components shown in FIG. 15 may include one or more components of the first UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, a memory, or a combination thereof, of the first UE described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the first UE described in connection with FIG. 2. In some aspects, the transmission component 1504 may be co-located with the reception component 1502 in a transceiver.

The reception component 1502 may receive, from a second UE, SCI that indicates a starting sidelink process of a sliding window of sidelink processes for which one or more HARQ responses are to be transmitted. The generation component 1508 may generate HARQ feedback for the sidelink processes in the sliding window. The transmission component 1504 may transmit the one or more HARQ responses to the second UE on a PSFCH.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in Figure may perform one or more functions described as being performed by another set of components shown in FIG. 15.

Figure 16:
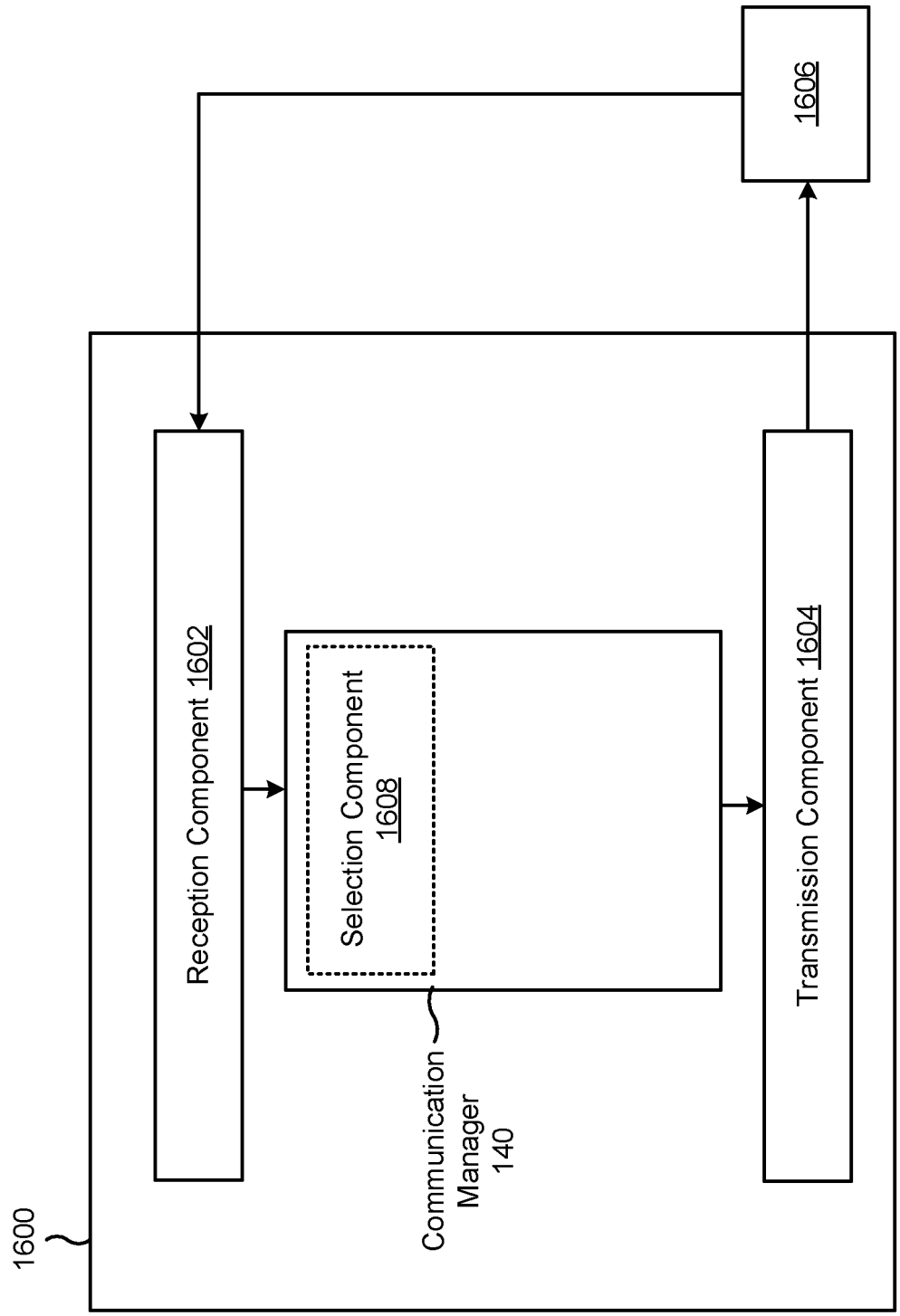

FIG. 16 is a diagram of an example apparatus 1600 for wireless communication. The apparatus 1600 may be a second UE, such as UE 304, or a second UE may include the apparatus 1600. In some aspects, the apparatus 1600 includes a reception component 1602 and a transmission component 1604, which may be in communication with one another (for example, via one or more buses or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include a selection component 1608, among other examples.

In some aspects, the apparatus 1600 may be configured to perform one or more operations described herein in connection with FIGS. 1-10. Additionally, or alternatively, the apparatus 1600 may be configured to perform one or more processes described herein, such as process 1200 of FIG. 12. In some aspects, the apparatus 1600 or one or more components shown in FIG. 16 may include one or more components of the second UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a modem, a demodulator, a MIMO detector, a receive processor, a controller/processor, a memory, or a combination thereof, of the second UE described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the second UE described in connection with FIG. 2. In some aspects, the transmission component 1604 may be co-located with the reception component 1602 in a transceiver.

The selection component 1608 may select a starting sidelink process for a sliding window or a set of sidelink processes based on sidelink processes for which HARQ feedback is not successfully received. The transmission component 1604 may transmit, to a first UE, SCI that indicates a starting sidelink process of a sliding window of sidelink processes for which one or more HARQ responses are to be transmitted. The reception component 1602 may receive the one or more HARQ responses from the first UE on a PSFCH.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
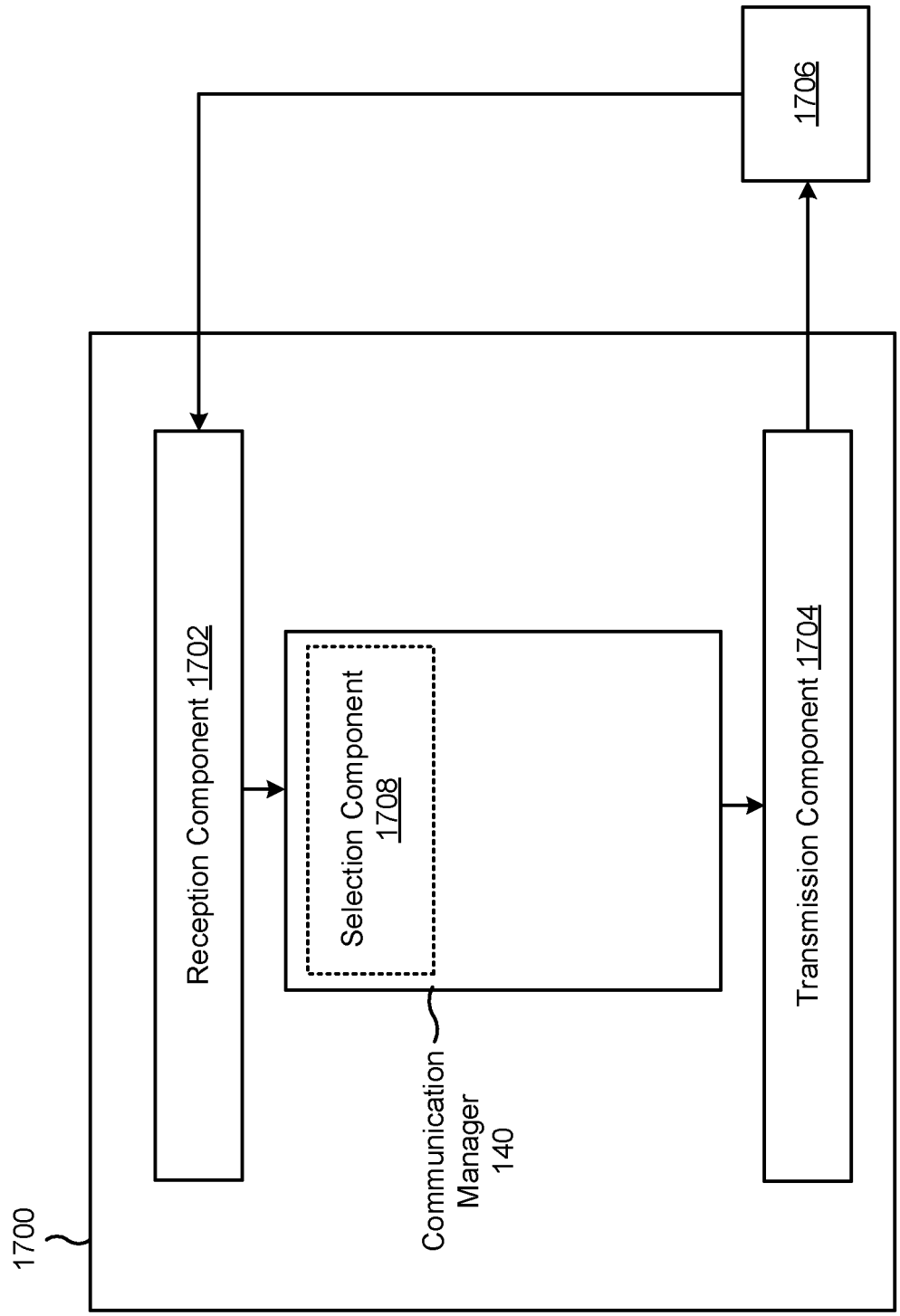

FIG. 17 is a diagram of an example apparatus 1700 for wireless communication. The apparatus 1700 may be a first UE, such as UE 302, or a first UE may include the apparatus 1700. In some aspects, the apparatus 1700 includes a reception component 1702 and a transmission component 1704, which may be in communication with one another (for example, via one or more buses or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 140. The communication manager 140 may include a selection component 1708, among other examples.

In some aspects, the apparatus 1700 may be configured to perform one or more operations described herein in connection with FIGS. 1-10. Additionally, or alternatively, the apparatus 1700 may be configured to perform one or more processes described herein, such as process 1300 of FIG. 13. In some aspects, the apparatus 1700 or one or more components shown in FIG. 17 may include one or more components of the first UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a modem, a demodulator, a MIMO detector, a receive processor, a controller/processor, a memory, or a combination thereof, of the first UE described in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the first UE described in connection with FIG. 2. In some aspects, the transmission component 1704 may be co-located with the reception component 1702 in a transceiver.

The selection component 1708 may select, in coordination with a second UE, a set of sidelink processes for which one or more HARQ responses are able to be transmitted. The transmission component 1704 may transmit, to the second UE on a PSFCH, the one or more HARQ responses for sidelink processes within the set of sidelink processes.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
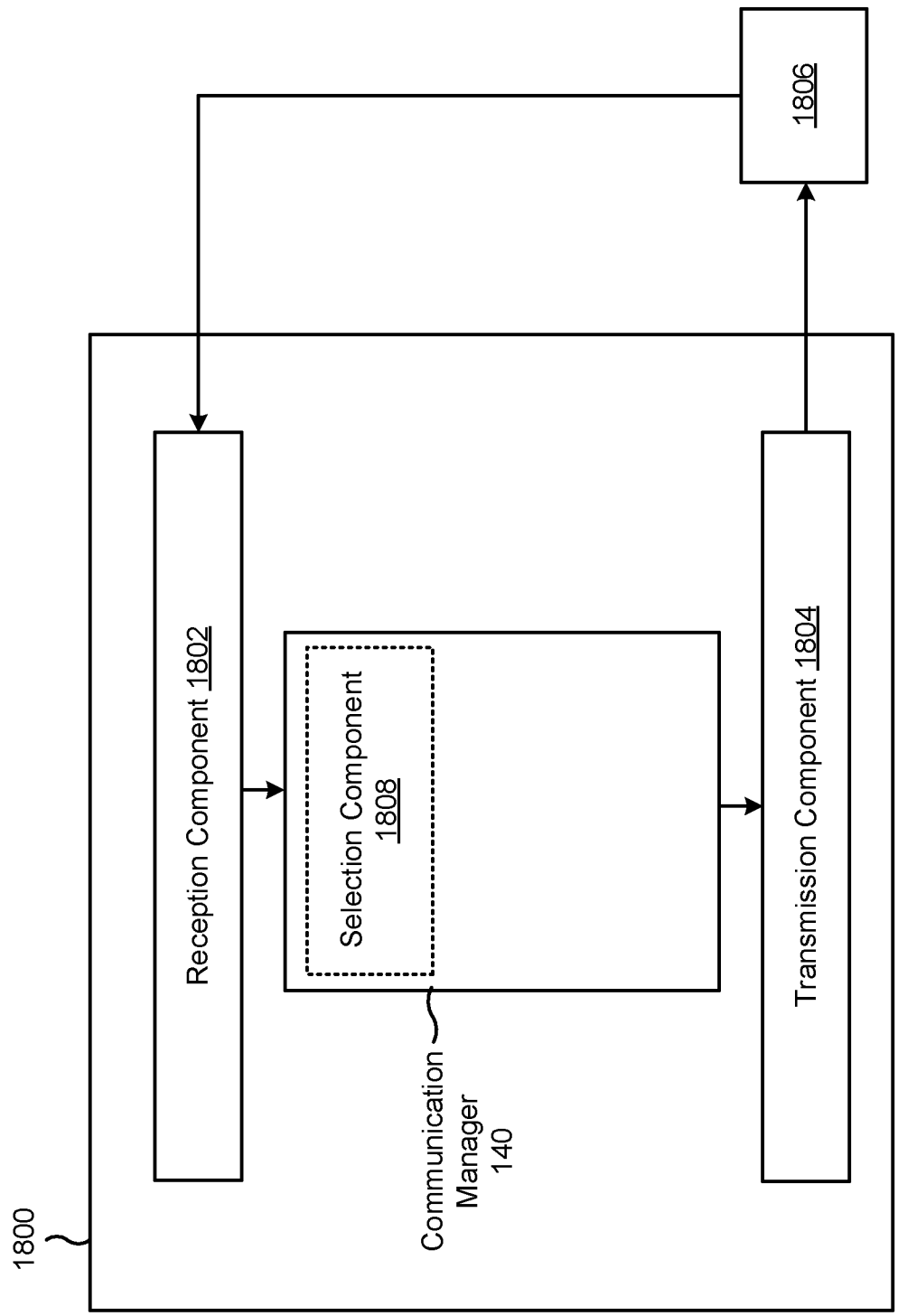

FIG. 18 is a diagram of an example apparatus 1800 for wireless communication. The apparatus 1800 may be a second UE, such as UE 304, or a second UE may include the apparatus 1800. In some aspects, the apparatus 1800 includes a reception component 1802 and a transmission component 1804, which may be in communication with one another (for example, via one or more buses or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 140. The communication manager 140 may include a selection component 1808, among other examples.

In some aspects, the apparatus 1800 may be configured to perform one or more operations described herein in connection with FIGS. 1-10. Additionally, or alternatively, the apparatus 1800 may be configured to perform one or more processes described herein, such as process 1400 of FIG. 14. In some aspects, the apparatus 1800 or one or more components shown in FIG. 18 may include one or more components of the second UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a modem, a demodulator, a MIMO detector, a receive processor, a controller/processor, a memory, or a combination thereof, of the second UE described in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the second UE described in connection with FIG. 2. In some aspects, the transmission component 1804 may be co-located with the reception component 1802 in a transceiver.

The selection component 1808 may select, in coordination with a first UE, a set of sidelink processes for which one or more HARQ responses are able to be transmitted by the first UE. The reception component 1802 may receive, from the first UE on a PSFCH, the one or more HARQ responses for sidelink processes within the set of sidelink processes.

The transmission component 1804 may transmit SCI that requests HARQ responses for the set of sidelink processes.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a first user equipment (UE), including: receiving, from a second UE, sidelink control information (SCI) that indicates a starting sidelink process of a sliding window of sidelink processes for which one or more hybrid automatic repeat request (HARQ) responses are to be transmitted; and transmitting the one or more HARQ responses to the second UE on a physical sidelink feedback channel (PSFCH).

Aspect 2: The method of Aspect 1, where the SCI indicates the starting sidelink process with m bits, and where m bits is a bit capacity of the PSFCH.

Aspect 3: The method of Aspect 2, where m is 4.

Aspect 4: The method of Aspect 2, where a HARQ response is requested for a current sidelink process, and m−1 bits indicate the starting sidelink process for a remainder of the sliding window.

Aspect 5: The method of Aspect 1, where a HARQ response is not requested for a current sidelink process, where the SCI indicates the starting sidelink process with m−1 bits, and where m bits is a bit capacity of the PSFCH.

Aspect 6: The method of Aspect 5, where m is 3.

Aspect 7: The method of any of Aspects 1-6, where m is a specified value stored at the first UE, and where the SCI indicates the starting sidelink process with a $\log_2(m)$-bit control sequence.

Aspect 8: The method of any of Aspects 1-7, where the SCI indicates the sliding window with m bits, and where the sliding window is one of multiple candidate sliding windows that are each associated with a bit capacity n of the PSFCH.

Aspect 9: The method of Aspect 8, where n is 1, 2, 4, 8, or 16, and where a quantity of candidate sidelink windows for a value of n is equal to 16 divided by n.

Aspect 10: The method of Aspect 8, where a quantity of sidelink processes in the sliding window is equal to n.

Aspect 11: The method of Aspect 8, where n is specified between the first UE and the second UE.

Aspect 12: The method of Aspect 11, where m is 3 if n is 4, 8, or 16.

Aspect 13: The method of Aspect 11, where m is 2 if n is 4.

Aspect 14: The method of Aspect 8, where the multiple candidate sliding windows are divided into a first half and a second half, and where the indicated sidelink window is from either the first half or the second half based on a current sidelink process.

Aspect 15: The method of Aspect 14, where m is 3, and where the first half and the second half each include 8 sets of sidelink processes.

Aspect 16: A method of wireless communication performed by a second user equipment (UE), including: transmitting, to a first UE, sidelink control information (SCI) that indicates a starting sidelink process of a sliding window of sidelink processes for which one or more hybrid automatic repeat request (HARQ) responses are to be transmitted; and receiving the one or more HARQ responses from the first UE on a physical sidelink feedback channel (PSFCH).

Aspect 17: The method of Aspect 16, where the SCI indicates the starting sidelink process with m bits, and where m bits is a bit capacity of the PSFCH.

Aspect 18: The method of Aspect 17, where m is 4.

Aspect 19: The method of Aspect 17, where a HARQ response is requested for a current sidelink process, and m−1 bits indicate the starting sidelink process for a remainder of the sliding window.

Aspect 20: The method of Aspect 16, where a HARQ response is not requested for a current sidelink process, where the SCI indicates the starting sidelink process with m−1 bits, and where m bits is a bit capacity of the PSFCH.

Aspect 21: The method of Aspect 20, where m is 3.

Aspect 22: The method of any of Aspects 16-21, where m is a specified value stored at the first UE, and where the SCI indicates the starting sidelink process with a $\log_2(m)$-bit control sequence.

Aspect 23: The method of any of Aspects 16-22, where the SCI indicates the sliding window with m bits, and where the sliding window is one of multiple candidate sliding windows that are each associated with a bit capacity n of the PSFCH.

Aspect 24: The method of Aspect 23, where n is 1, 2, 4, 8, or 16, and where a quantity of candidate sidelink windows for a value of n is equal to 16 divided by n.

Aspect 25: The method of Aspect 23, where a quantity of sidelink processes in the sliding window is equal to n.

Aspect 26: The method of Aspect 23, where n is specified between the first UE and the second UE.

Aspect 27: The method of Aspect 26, where m is 3 if n is 4, 8, or 16.

Aspect 28: The method of Aspect 26, where m is 2 if n is 4.

Aspect 29: The method of Aspect 23, where the multiple candidate sliding windows are divided into a first half and a second half, and where the indicated sidelink window is from either the first half or the second half based on a current sidelink process.

Aspect 30: The method of Aspect 29, where m is 3, and where the first half and the second half each include 8 sets of sidelink processes.

Aspect 31: A method of wireless communication performed by a first user equipment (UE), including: selecting, in coordination with a second UE, a set of sidelink processes for which one or more hybrid automatic repeat request (HARQ) responses are able to be transmitted; and transmitting, to the second UE on a physical sidelink feedback channel (PSFCH), the one or more HARQ responses for sidelink processes within the set of sidelink processes.

Aspect 32: The method of Aspect 31, where the transmitting includes transmitting, independent of receiving sidelink control information associated with HARQ, HARQ responses for all sidelink processes in the set of sidelink processes.

Aspect 33: The method of Aspect 31, where the transmitting includes transmitting, in connection with receiving sidelink control information associated with HARQ, HARQ responses for all sidelink processes in the set of sidelink processes.

Aspect 34: A method of wireless communication performed by a second user equipment (UE), including: selecting, in coordination with a first UE, a set of sidelink processes for which one or more hybrid automatic repeat request (HARQ) responses are able to be transmitted by the first UE; and receiving, from the first UE on a physical sidelink feedback channel (PSFCH), the one or more HARQ responses for sidelink processes within the set of sidelink processes.

Aspect 35: The method of Aspect 34, where the receiving includes receiving HARQ responses for all sidelink processes in the set of sidelink processes.

Aspect 36: The method of Aspect 35, further including transmitting sidelink control information that requests HARQ responses for the set of sidelink processes.

Aspect 37: An apparatus for wireless communication at a device, including a processor; memory coupled with the processor; and instructions stored in the memory and executable by the processor to cause the apparatus to perform the method of one or more of Aspects 1-36.

Aspect 38: A device for wireless communication, including a memory and one or more processors coupled to the memory, the one or more processors configured to perform the method of one or more of Aspects 1-36.

Aspect 39: An apparatus for wireless communication, including at least one means for performing the method of one or more of Aspects 1-36.

Aspect 40: A non-transitory computer-readable medium storing code for wireless communication, the code including instructions executable by a processor to perform the method of one or more of Aspects 1-36.

Aspect 41: A non-transitory computer-readable medium storing a set of instructions for wireless communication, the set of instructions including one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus of a first user equipment (UE) for wireless communication, comprising:
   a first interface configured to obtain, from a second UE, sidelink control information (SCI) that indicates a starting sidelink process of a sliding window comprising one or more sidelink processes for which one or more hybrid automatic repeat request (HARQ) responses are to be transmitted; and
   the first interface or a second interface configured to output, to the second UE on a physical sidelink feedback channel (PSFCH), the one or more HARQ responses for the one or more sidelink processes in the sliding window.

2. The apparatus of claim 1, wherein the SCI indicates the starting sidelink process with m bits, and
   wherein m bits is a bit capacity of the PSFCH.

3. The apparatus of claim 2, wherein a HARQ response is requested for a current sidelink process, and m−1 bits indicate the starting sidelink process for a remainder of the sliding window.

4. The apparatus of claim 1, wherein a HARQ response is not requested for a current sidelink process,
   wherein the SCI indicates the starting sidelink process with m−1 bits, and
   wherein m bits is a bit capacity of the PSFCH.

5. The apparatus of claim 1, wherein m is a specified value stored at the first UE, and
   wherein the SCI indicates the starting sidelink process with a log 2(m)-bit control sequence.

6. The apparatus of claim 1, wherein the SCI indicates the sliding window with m bits, and
   wherein the sliding window is one of multiple candidate sliding windows that are each associated with a bit capacity n of the PSFCH.

7. The apparatus of claim 6, wherein n is 1, 2, 4, 8, or 16, and
   wherein a quantity of candidate sidelink windows for a value of n is equal to 16 divided by n.

8. The apparatus of claim 6, wherein a quantity of sidelink processes in the sliding window is equal to n.

9. The apparatus of claim 6, wherein n is specified between the first UE and the second UE.

10. The apparatus of claim 9, wherein m is 3 when n is 4, 8, or 16.

11. The apparatus of claim 9, wherein m is 2 when n is 4.

12. The apparatus of claim 6, wherein the multiple candidate sliding windows are divided into a first half and a second half, and
wherein the sidelink window is from either the first half or the second half based on a current sidelink process.

13. The apparatus of claim 12, wherein m is 3, and
wherein the first half and the second half each include 8 sets of sidelink processes.

14. An apparatus of a first user equipment (UE) for wireless communication, comprising:
a first interface and a second interface configured to select, in coordination with a second UE and from a set of sidelink processes, a subset of sidelink processes for which one or more hybrid automatic repeat request (HARQ) responses are able to be transmitted, the subset of sidelink processes comprising fewer sidelink processes than the set of sidelink processes; and
the first interface or the second interface configured to output, to the second UE on a physical sidelink feedback channel (PSFCH), the one or more HARQ responses for sidelink processes within the subset of sidelink processes.

15. The apparatus of claim 14, wherein the first interface or the second interface is configured to output, independent of receiving sidelink control information associated with HARQ, HARQ responses for all sidelink processes in the subset of sidelink processes.

16. The apparatus of claim 14, wherein the first interface or the second interface is configured to output, in connection with receiving sidelink control information associated with HARQ, HARQ responses for all sidelink processes in the subset of sidelink processes.

17. A method of wireless communication performed at a first user equipment (UE), comprising:
receiving, from a second UE, sidelink control information (SCI) that indicates a starting sidelink process of a sliding window comprising one or more sidelink processes for which one or more hybrid automatic repeat request (HARQ) responses are to be transmitted; and
transmitting, to the second UE on a physical sidelink feedback channel (PSFCH), the one or more HARQ responses for the one or more sidelink processes in the sliding window.

18. The method of claim 17, wherein the SCI indicates the starting sidelink process with m bits, and
wherein m bits is a bit capacity of the PSFCH.

19. The method of claim 18, wherein a HARQ response is requested for a current sidelink process, and m−1 bits indicate the starting sidelink process for a remainder of the sliding window.

20. The method of claim 17, wherein a HARQ response is not requested for a current sidelink process,
wherein the SCI indicates the starting sidelink process with m−1 bits, and
wherein m bits is a bit capacity of the PSFCH.

21. The method of claim 17, wherein m is a specified value stored at the first UE, and
wherein the SCI indicates the starting sidelink process with a log 2(m)-bit control sequence.

22. The method of claim 17, wherein the SCI indicates the sliding window with m bits, and
wherein the sliding window is one of multiple candidate sliding windows that are each associated with a bit capacity n of the PSFCH.

23. The method of claim 22, wherein n is 1, 2, 4, 8, or 16, and
wherein a quantity of candidate sidelink windows for a value of n is equal to 16 divided by n.

24. The method of claim 22, wherein a quantity of sidelink processes in the sliding window is equal to n.

25. The method of claim 22, wherein n is specified between the first UE and the second UE.

26. The method of claim 22, wherein the multiple candidate sliding windows are divided into a first half and a second half, and
wherein the sidelink window is from either the first half or the second half based on a current sidelink process.

27. The method of claim 26, wherein m is 3, and
wherein the first half and the second half each include 8 sets of sidelink processes.

28. A method of wireless communication performed at a first user equipment (UE), comprising:
selecting, in coordination with a second UE and from a set of sidelink processes, a subset of sidelink processes for which one or more hybrid automatic repeat request (HARQ) responses are able to be transmitted, the subset of sidelink processes comprising fewer sidelink processes than the set of sidelink processes; and
transmitting, to the second UE on a physical sidelink feedback channel (PSFCH), the one or more HARQ responses for sidelink processes within the subset of sidelink processes.

29. The method of claim 28, wherein the transmitting includes transmitting, independent of receiving sidelink control information associated with HARQ, HARQ responses for all sidelink processes in the subset of sidelink processes.

30. The method of claim 28, wherein the transmitting includes transmitting, in connection with receiving sidelink control information associated with HARQ, HARQ responses for all sidelink processes in the subset of sidelink processes.

* * * * *